United States Patent
Crites et al.

(10) Patent No.: US 11,333,042 B2
(45) Date of Patent: May 17, 2022

(54) TURBINE BLADE WITH DUST TOLERANT COOLING SYSTEM

(71) Applicant: HONEYWELL INTERNATIONAL INC., Morris Plains, NJ (US)

(72) Inventors: Daniel C. Crites, Mesa, AZ (US); Mark C. Morris, Phoenix, AZ (US); Steven Whitaker, Phoenix, AZ (US); David Waldman, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/998,523

(22) Filed: Aug. 20, 2020

(65) Prior Publication Data

US 2020/0378277 A1    Dec. 3, 2020

Related U.S. Application Data

(63) Continuation of application No. 16/035,191, filed on Jul. 13, 2018, now Pat. No. 10,787,932.

(51) Int. Cl.
*F01D 25/32* (2006.01)
*F01D 5/18* (2006.01)
*F01D 5/20* (2006.01)

(52) U.S. Cl.
CPC .............. *F01D 25/32* (2013.01); *F01D 5/187* (2013.01); *F01D 5/20* (2013.01);
(Continued)

(58) Field of Classification Search
CPC . F01D 5/18; F01D 5/186; F01D 5/187; F01D 5/20; F01D 25/32
See application file for complete search history.

(56) References Cited

U.S. PATENT DOCUMENTS 4,142,824 A   3/1979   Andersen
4,180,373 A   12/1979  Moore et al.
(Continued)

FOREIGN PATENT DOCUMENTS

CN    102182518 A    9/2011
EP    1006263 A1     6/2000
(Continued)

OTHER PUBLICATIONS

Kwak, JS, et al.; Heat Transfer Coefficients and Film Cooling Effectiveness on the Squealer Tip of a Gas Turbine Blade; Turbine Heat Transfer Laboratory, Department of Mechanical Engineering, Texas A&M University, vol. 125, Oct. 2003, Transactions of the ASME, [Retrieved from Internet Jul. 10, 2013] [http://turbomachinery.asmedigitalcollection.asme.org].
(Continued)

*Primary Examiner* — Topaz L. Elliott
(74) *Attorney, Agent, or Firm* — Lorenz & Kopf, LLP

(57) ABSTRACT

A turbine blade includes an airfoil that has a tip region that extends from the leading edge toward the trailing edge, and the tip region is bounded by a wall that extends at an angle. The leading edge has a leading edge cooling circuit that is defined from the platform to a tip flag channel, and the leading edge cooling circuit is in fluid communication with the tip flag channel. The pressure side includes at least one tip dust hole defined through the wall proximate the pressure side, and the at least one tip dust hole has an inlet and an outlet. The airfoil has at least one rib defined on the wall that extends at a second angle to direct the particles and a portion of the cooling fluid into the inlet.

20 Claims, 27 Drawing Sheets

(52) U.S. Cl.
CPC .. *F05D 2220/323* (2013.01); *F05D 2240/303* (2013.01); *F05D 2240/307* (2013.01); *F05D 2260/2212* (2013.01); *F05D 2260/22141* (2013.01)

(56) References Cited

U.S. PATENT DOCUMENTS

| | | | |
|---|---|---|---|
| 4,183,716 A | | 1/1980 | Takahara et al. |
| 4,257,737 A | | 3/1981 | Andress et al. |
| 4,390,320 A | | 6/1983 | Eiswerth |
| 4,514,144 A | * | 4/1985 | Lee .................... B22C 9/04 |
| | | | 416/96 R |
| 4,529,357 A | | 7/1985 | Holland |
| 4,589,823 A | | 5/1986 | Koffel |
| 5,039,562 A | | 8/1991 | Liang |
| 5,100,293 A | | 3/1992 | Anzai et al. |
| 5,192,192 A | | 3/1993 | Ourhaan |
| 5,282,721 A | | 2/1994 | Kildea |
| 5,356,265 A | | 10/1994 | Kercher |
| 5,688,107 A | | 11/1997 | Downs et al. |
| 5,695,321 A | * | 12/1997 | Kercher .............. F01D 5/187 |
| | | | 416/97 R |
| 5,733,102 A | | 3/1998 | Lee et al. |
| 5,919,031 A | * | 7/1999 | Hall .................... F01D 5/187 |
| | | | 416/96 R |
| 5,931,638 A | | 8/1999 | Krause et al. |
| 5,967,752 A | | 10/1999 | Lee et al. |
| 5,971,708 A | | 10/1999 | Lee |
| 6,164,914 A | | 12/2000 | Correia et al. |
| 6,179,556 B1 | | 1/2001 | Bunker |
| 6,190,129 B1 | | 2/2001 | Mayer et al. |
| 6,224,336 B1 | | 5/2001 | Kercher |
| 6,231,307 B1 | | 5/2001 | Correia |
| 6,328,532 B1 | | 12/2001 | Hahnle |
| 6,347,923 B1 | | 2/2002 | Semmler et al. |
| 6,422,821 B1 | | 7/2002 | Lee et al. |
| 6,478,535 B1 | | 11/2002 | Chung et al. |
| 6,494,678 B1 | | 12/2002 | Bunker |
| 6,527,514 B2 | | 3/2003 | Roeloffs |
| 6,595,748 B2 | | 7/2003 | Flodman et al. |
| 6,602,052 B2 | | 8/2003 | Liang |
| 6,634,860 B2 | | 10/2003 | Lee et al. |
| 6,672,829 B1 | | 1/2004 | Cherry et al. |
| 6,790,005 B2 | | 9/2004 | Lee et al. |
| 6,932,571 B2 | | 8/2005 | Cunha et al. |
| 6,974,308 B2 | | 12/2005 | Halfmann et al. |
| 6,981,846 B1 | | 1/2006 | Liang |
| 6,994,514 B2 | | 2/2006 | Soechting et al. |
| 7,018,176 B2 | | 3/2006 | Mongillo et al. |
| 7,097,425 B2 | | 8/2006 | Cunha et al. |
| 7,104,757 B2 | | 9/2006 | Gross |
| 7,192,250 B2 | | 3/2007 | Boury et al. |
| 7,195,458 B2 | | 3/2007 | Liang |
| 7,281,895 B2 | | 10/2007 | Liang |
| 7,351,035 B2 | | 4/2008 | Deschamps et al. |
| 7,473,073 B1 | | 1/2009 | Liang |
| 7,494,319 B1 | | 2/2009 | Liang |
| 7,510,376 B2 | | 3/2009 | Lee et al. |
| 7,530,788 B2 | | 5/2009 | Boury et al. |
| 7,568,887 B1 | | 8/2009 | Liang |
| 7,591,070 B2 | | 9/2009 | Lee |
| 7,654,795 B2 | | 2/2010 | Tibbott |
| 7,695,243 B2 | | 4/2010 | Lee et al. |
| 7,695,248 B2 | | 4/2010 | Mons et al. |
| 7,857,587 B2 | | 12/2010 | Correia et al. |
| 7,862,299 B1 | | 1/2011 | Liang |
| 7,914,257 B1 | | 3/2011 | Liang |
| 7,922,451 B1 | | 4/2011 | Liang |
| 7,963,745 B1 | | 6/2011 | Liang |
| 7,972,115 B2 | | 7/2011 | Potier |
| 7,980,818 B2 | | 7/2011 | Kizuka et al. |
| 8,061,987 B1 | | 11/2011 | Liang |
| 8,061,989 B1 | | 11/2011 | Liang |
| 8,070,443 B1 | | 12/2011 | Liang |
| 8,075,268 B1 | | 12/2011 | Liang |
| 8,092,178 B2 | | 1/2012 | Marini et al. |
| 8,113,779 B1 | | 2/2012 | Liang |
| 8,182,221 B1 | | 5/2012 | Liang |
| 8,215,909 B2 | | 7/2012 | Grob |
| 8,246,307 B2 | | 8/2012 | Cheong et al. |
| 8,292,581 B2 | | 10/2012 | Poon et al. |
| 8,366,394 B1 | | 2/2013 | Liang |
| 8,414,265 B2 | | 4/2013 | Willett, Jr. |
| 8,435,004 B1 | | 5/2013 | Liang |
| 8,491,263 B1 | | 7/2013 | Liang |
| 8,770,920 B2 | | 7/2014 | Naik et al. |
| 8,777,572 B2 | | 7/2014 | Cheong et al. |
| 8,858,159 B2 | | 10/2014 | Piggush et al. |
| 8,864,469 B1 | | 10/2014 | Liang |
| 8,920,124 B2 | | 12/2014 | Lee |
| 9,206,740 B2 | | 12/2015 | Wong et al. |
| 9,267,381 B2 | | 2/2016 | Morris et al. |
| 9,518,468 B2 | | 12/2016 | Tibbott et al. |
| 9,856,739 B2 | | 1/2018 | Bedrosyan et al. |
| 10,174,620 B2 | | 1/2019 | Krumanaker et al. |
| 10,502,065 B2 | | 12/2019 | Quach et al. |
| 2002/0197159 A1 | | 12/2002 | Roeloffs |
| 2003/0021684 A1 | | 1/2003 | Downs et al. |
| 2003/0108422 A1 | | 6/2003 | Merry |
| 2005/0232771 A1 | | 10/2005 | Harvey et al. |
| 2006/0062671 A1 | | 3/2006 | Lee et al. |
| 2006/0120869 A1 | | 6/2006 | Wilson et al. |
| 2007/0077144 A1 | * | 4/2007 | Lee .................... F01D 5/187 |
| | | | 416/193 A |
| 2007/0134096 A1 | | 6/2007 | Mons et al. |
| 2007/0237637 A1 | | 10/2007 | Lee et al. |
| 2008/0118363 A1 | | 5/2008 | Lee et al. |
| 2009/0081024 A1 | | 3/2009 | Tibbott |
| 2009/0148305 A1 | | 6/2009 | Riahi et al. |
| 2009/0155088 A1 | | 6/2009 | Lee et al. |
| 2010/0054952 A1 | | 3/2010 | Gross |
| 2010/0135813 A1 | | 6/2010 | Marini et al. |
| 2010/0135822 A1 | | 6/2010 | Marini et al. |
| 2010/0221122 A1 | | 9/2010 | Klasing et al. |
| 2011/0176929 A1 | | 7/2011 | Ammann |
| 2012/0070307 A1 | | 3/2012 | Poon et al. |
| 2012/0076660 A1 | | 3/2012 | Spangler et al. |
| 2012/0201695 A1 | * | 8/2012 | Little .................... F01D 5/20 |
| | | | 416/97 R |
| 2014/0130354 A1 | | 5/2014 | Pal et al. |
| 2015/0003975 A1 | * | 1/2015 | Shchukin ............ F01D 5/18 |
| | | | 415/178 |
| 2015/0078916 A1 | * | 3/2015 | Bedrosyan ......... F01D 5/186 |
| | | | 416/97 R |
| 2016/0194965 A1 | | 7/2016 | Spangler |
| 2016/0341046 A1 | | 11/2016 | Feldmann et al. |
| 2017/0107826 A1 | | 4/2017 | Krumanaker |
| 2017/0107829 A1 | | 4/2017 | Krumanaker et al. |
| 2017/0370232 A1 | | 12/2017 | Lee et al. |
| 2018/0283182 A1 | | 10/2018 | Kamrath et al. |
| 2018/0318952 A1 | | 11/2018 | Frost et al. |
| 2018/0347466 A1 | | 12/2018 | Correia et al. |
| 2019/0255609 A1 | | 8/2019 | Godfrey et al. |
| 2021/0187594 A1 | * | 6/2021 | Ostino .................. F01D 5/20 |
| 2021/0215063 A1 | * | 7/2021 | Prenter ................. F01D 5/18 |

FOREIGN PATENT DOCUMENTS

| | | | |
|---|---|---|---|
| EP | 1281837 A1 | 2/2003 | |
| EP | 1422383 A2 | 5/2004 | |
| EP | 1496204 A1 | 1/2005 | |
| EP | 1726783 A1 | 11/2006 | |
| EP | 1736636 A1 | 12/2006 | |
| EP | 1793086 A2 | 6/2007 | |
| EP | 2434097 A1 | 3/2012 | |
| EP | 1882817 B1 | 2/2017 | |
| WO | WO-2018153796 A1 * | 8/2018 | ............ F01D 5/187 |

OTHER PUBLICATIONS

Ahn, J, et al.; Film-Cooling Effectiveness on a Gas Turbine Blade Tip Using Pressure-Sensitive Paint; Turbine Heat Transfer Laboratory, Department of Mechanical Engineering, Texas A&M Univer-

(56) References Cited

OTHER PUBLICATIONS sity, Journal of Heat Transfer, vol. 127, May 2005, [Retrieved from Internet Jul. 10, 2013] [http://heattransfer.asmedigitalcollection.asme.org].

Cohen, J. and Bourell, D.L., "Development of Novel Tapered Pin Fin Geometries for Additive Manufacturing of Compact Heat Exchangers," Proc, of the 27th Annual International Solid Freeform Fabrication Symposium, Nov. 2016, pp. 2314-2336.

* cited by examiner

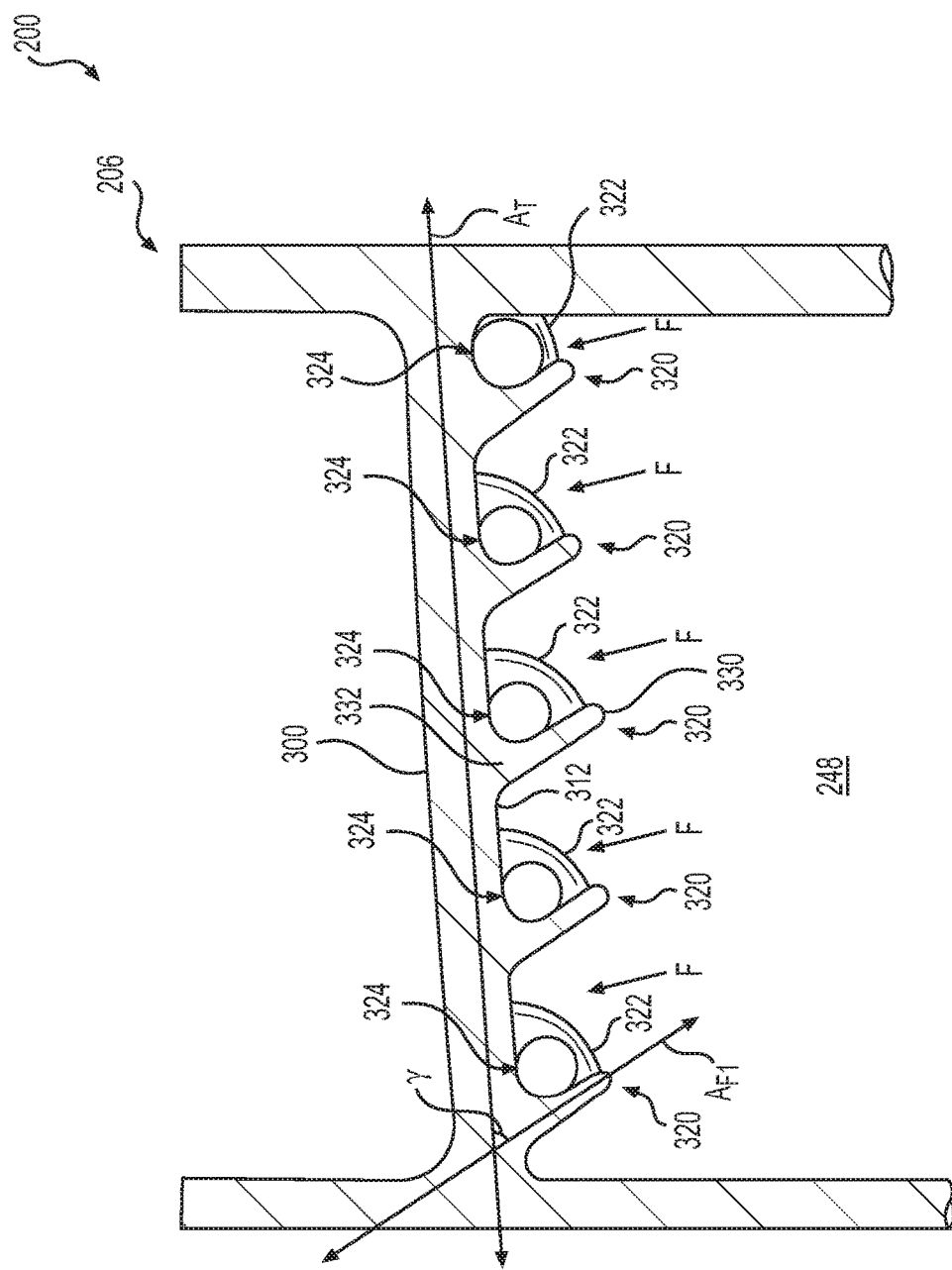

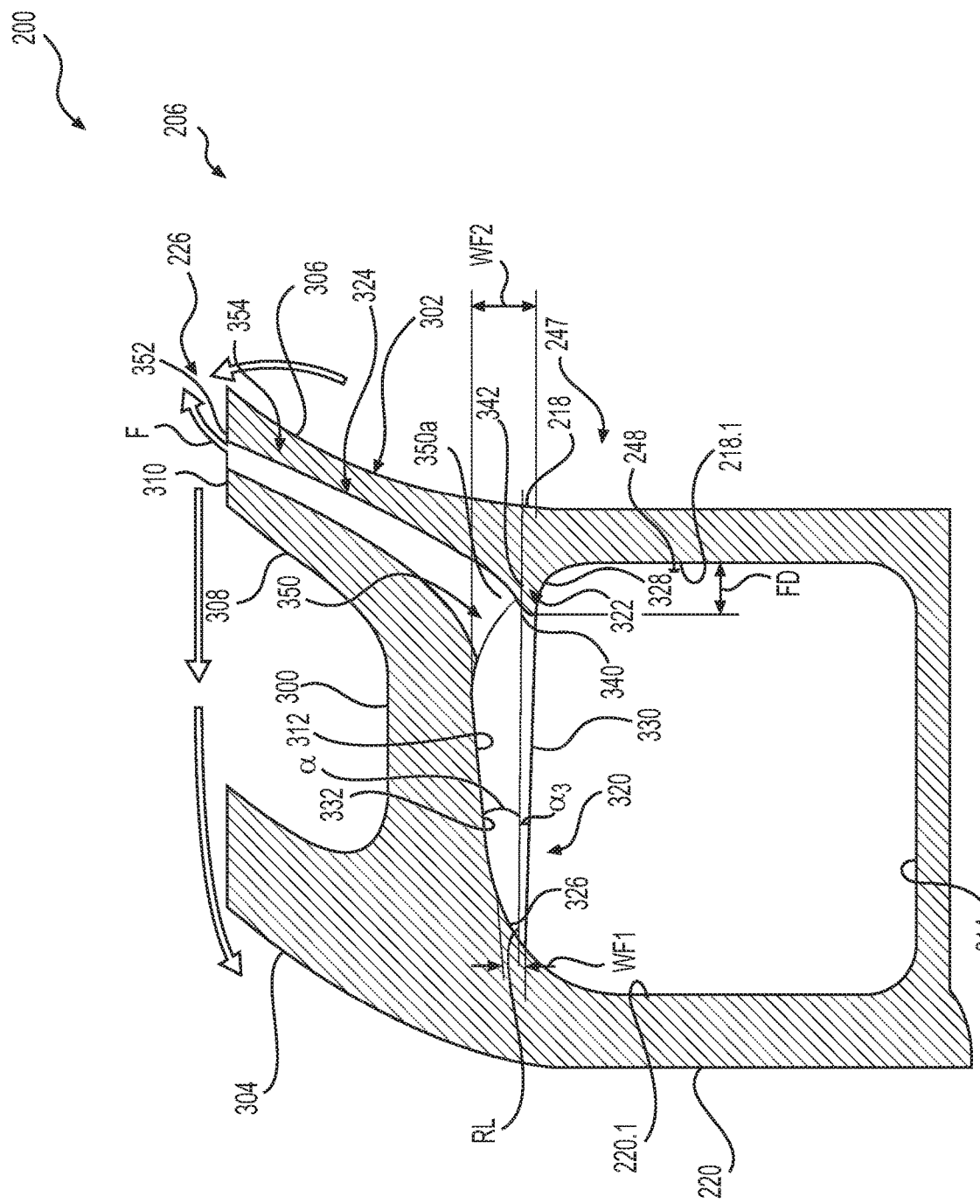

TURBINE BLADE WITH DUST TOLERANT COOLING SYSTEM

CROSS-REFERENCE TO RELATED APPLICATION

This application is a continuation of U.S. patent application Ser. No. 16/035,191 filed on Jul. 13, 2018. The relevant disclosure of the above application is incorporated herein by reference.

TECHNICAL FIELD

The present disclosure generally relates to gas turbine engines, and more particularly relates to a turbine blade having a dust tolerant cooling system associated with a turbine of the gas turbine engine.

BACKGROUND

Gas turbine engines may be employed to power various devices. For example, a gas turbine engine may be employed to power a mobile platform, such as an aircraft. Gas turbine engines employ a combustion chamber upstream from one or more turbines, and as high temperature gases from the combustion chamber are directed into these turbines these high temperature gases contact downstream airfoils, such as the airfoils of a turbine blade. Typically, the leading edge of these airfoils experiences the full effect of the high temperature gases, which may increase the risk of oxidation of the leading edge. As higher turbine inlet temperature and higher turbine engine speed are required to improve gas turbine engine efficiency, additional cooling of the leading edge of these airfoils is needed to reduce a risk of oxidation of these airfoils associated with the gas turbine engine.

Further, in the example of the gas turbine engine powering a mobile platform, certain operating environments, such as desert operating environments, may cause the gas turbine engine to ingest fine sand and dust particles. These ingested fine sand and dust particles may pass through portions of the gas turbine engine and may accumulate in stagnation regions of cooling circuits within turbine components, such as the airfoils of the turbine blade. The accumulation of the fine sand and dust particles in the stagnation regions of the cooling circuits in the turbine components, such as the airfoil, may impede the cooling of the airfoil, which in turn, may reduce the life of the airfoil leading to increased repair costs and downtime for the gas turbine engine.

Accordingly, it is desirable to provide improved cooling for an airfoil of a turbine blade with a dust tolerant cooling system that reduces the accumulation of fine sand and dust particles while cooling the airfoil in the leading edge region of the airfoil, for example. Furthermore, other desirable features and characteristics of the present invention will become apparent from the subsequent detailed description and the appended claims, taken in conjunction with the accompanying drawings and the foregoing technical field and background.

SUMMARY

According to various embodiments, a turbine blade is provided. The turbine blade includes an airfoil that extends from a platform to a tip, and from a leading edge to a trailing edge. The airfoil has a pressure side and an opposite suction side. The tip has a tip region that extends from the leading edge toward the trailing edge, and the tip region is bounded by a wall that extends from the suction side to the pressure side at a positive angle. A tip flag channel is defined by at least the pressure side, the suction side and the wall. The leading edge has a leading edge cooling circuit that is defined from the platform to the tip flag channel, and the leading edge cooling circuit is in fluid communication with the tip flag channel to direct cooling fluid received from the platform radially into the tip flag channel. The pressure side includes at least one tip dust hole defined through the wall proximate the pressure side, and the at least one tip dust hole has an inlet in fluid communication with the tip flag channel and an outlet in fluid communication with a fluid surrounding the tip of the airfoil to direct particles in the cooling fluid out of the airfoil. The airfoil has at least one rib defined on the wall that extends from the suction side to the pressure side at a second angle, and the at least one rib merges with at least one flow scoop to direct the particles and a portion of the cooling fluid into the inlet of the at least one tip dust hole.

Further provided is a turbine blade. The turbine blade includes an airfoil that extends from a platform to a tip, and from a leading edge to a trailing edge. The airfoil has a pressure side and an opposite suction side, and the pressure side of the airfoil includes a squealer tip extension. The tip has a tip region that extends from the leading edge toward the trailing edge, and the tip region is bounded by a wall that extends from the suction side to the pressure side at a positive angle. A tip flag channel is defined by at least the pressure side, the suction side and the wall. The leading edge has a leading edge cooling circuit that is defined from the platform to the tip flag channel, and the leading edge cooling circuit is in fluid communication with the tip flag channel to direct cooling fluid received from the platform radially into the tip flag channel. The pressure side includes at least one tip dust hole defined through the squealer tip extension, and the at least one tip dust hole has an inlet in fluid communication with the tip flag channel and an outlet in fluid communication with a fluid surrounding the tip of the airfoil to direct particles in the cooling fluid out of the airfoil. The inlet of the at least one tip dust hole is offset from the outlet of the tip dust hole. The turbine blade includes at least one rib defined on the wall that extends from the suction side to the pressure side at a second angle, and the at least one rib merges with at least one flow scoop to direct the particles and a portion of the cooling fluid into the inlet of the at least one tip dust hole.

Also provided according to various embodiments is a turbine blade. The turbine blade includes an airfoil that extends from a platform to a tip, and from a leading edge to a trailing edge. The airfoil has a pressure side and an opposite suction side, and the pressure side of the airfoil includes a squealer tip extension. The tip has a tip region that extends from the leading edge toward the trailing edge, and the tip region is bounded by a wall that extends from the suction side to the pressure side at a positive angle. A tip flag channel is defined by at least the pressure side, the suction side and the wall. The leading edge has a leading edge cooling circuit that is defined from the platform to the tip flag channel, and the leading edge cooling circuit is in fluid communication with the tip flag channel to direct cooling fluid received from the platform radially into the tip flag channel. The pressure side includes at least one tip dust hole defined through the squealer tip extension, and the at least one tip dust hole has an inlet in fluid communication with the tip flag channel and an outlet in fluid communication with a fluid surrounding the tip of the airfoil to direct particles in the cooling fluid out of the airfoil. The inlet of the at least one tip dust hole is offset from the outlet of the tip dust hole. The turbine blade includes at least one flow scoop defined on the pressure side about a portion of a perimeter of the inlet of the at least one tip dust hole and the at least one flow scoop extends outwardly into the tip flag channel about the portion of the perimeter of the inlet. The turbine blade includes at least one rib defined on the wall that extends from the suction side to the pressure side at a second angle, and the at least one rib merges with at least one air scoop to direct the particles and a portion of the cooling fluid into the inlet of the at least one tip dust hole. The turbine blade includes a plurality of cooling features defined in the leading edge cooling circuit that are arranged in rows spaced apart radially within the leading edge cooling circuit.

DESCRIPTION OF THE DRAWINGS

The exemplary embodiments will hereinafter be described in conjunction with the following drawing figures, wherein like numerals denote like elements, and wherein:

FIG. 2D is a cross-sectional view of the turbine blade of FIG. 2 in accordance with an exemplary embodiment, taken along the perspective of line 2B-2B of FIG. 2A, in which flow directing ribs of the dust tolerant cooling system extend at an angle relative to a top wall of a tip flag channel of the turbine blade;

FIG. 8 is a cross-sectional view taken along line 8-8 of FIG. 2C, which illustrates a tip flow passage of the first conduit in accordance with various embodiments;

DETAILED DESCRIPTION

Figure 1:
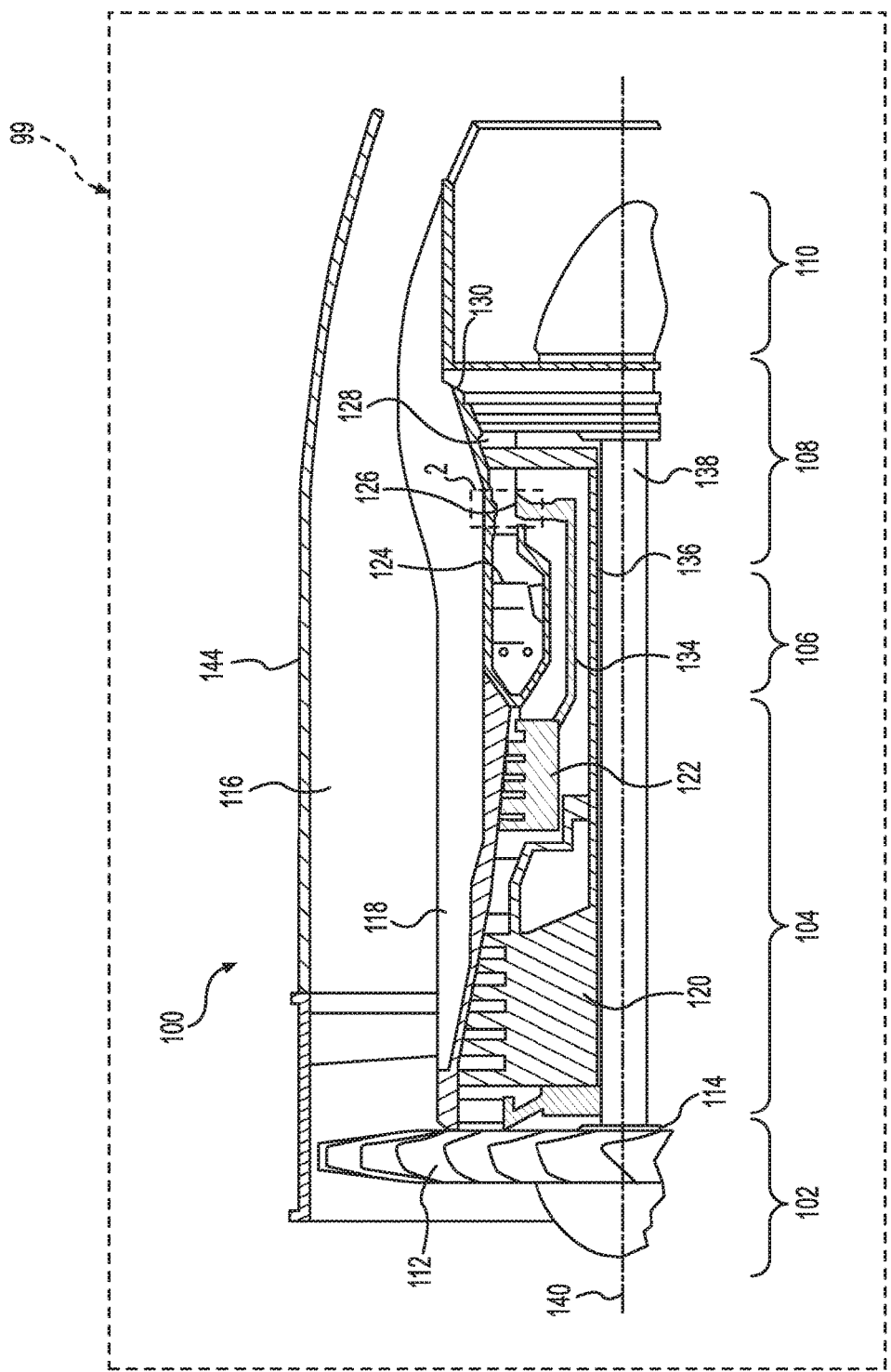
FIG. 1 is a schematic cross-sectional illustration of a gas turbine engine, which includes an exemplary turbine blade with a dust tolerant cooling system in accordance with the various teachings of the present disclosure.

The following detailed description is merely exemplary in nature and is not intended to limit the application and uses.

Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from increased cooling via a dust tolerant cooling system, and that the airfoil described herein for use with a turbine blade of a gas turbine engine is merely one exemplary embodiment according to the present disclosure. Moreover, while the turbine blade including the dust tolerant cooling system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel. Also as used herein, the terms "integrally formed" and "integral" mean one-piece and exclude brazing, fasteners, or the like for maintaining portions thereon in a fixed relationship as a single unit.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIG. 2, the gas turbine engine 100 includes a turbine blade 200 that has a dust tolerant cooling system 202 for providing improved cooling of a leading edge 204 of an airfoil 206. By providing the airfoil 206 of the turbine blade 200 with the dust tolerant cooling system 202, the cooling of the leading edge 204 of the airfoil 206 is increased by convective heat transfer between the dust tolerant cooling system 202 and a low temperature cooling fluid F received into the turbine blade 200. The dust tolerant cooling system 202 improves cooling of the leading edge 204 of the airfoil 206 associated with the turbine blade 200 by providing improved convective heat transfer between the leading edge 204 and the cooling fluid F, which reduces a risk of oxidation or other distress of the airfoil 206. The dust tolerant cooling system 202 also reduces an accumulation of fine sand and dust particles within the dust tolerant cooling system 202.

In this example, with reference back to FIG. 1, the gas turbine engine 100 includes fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
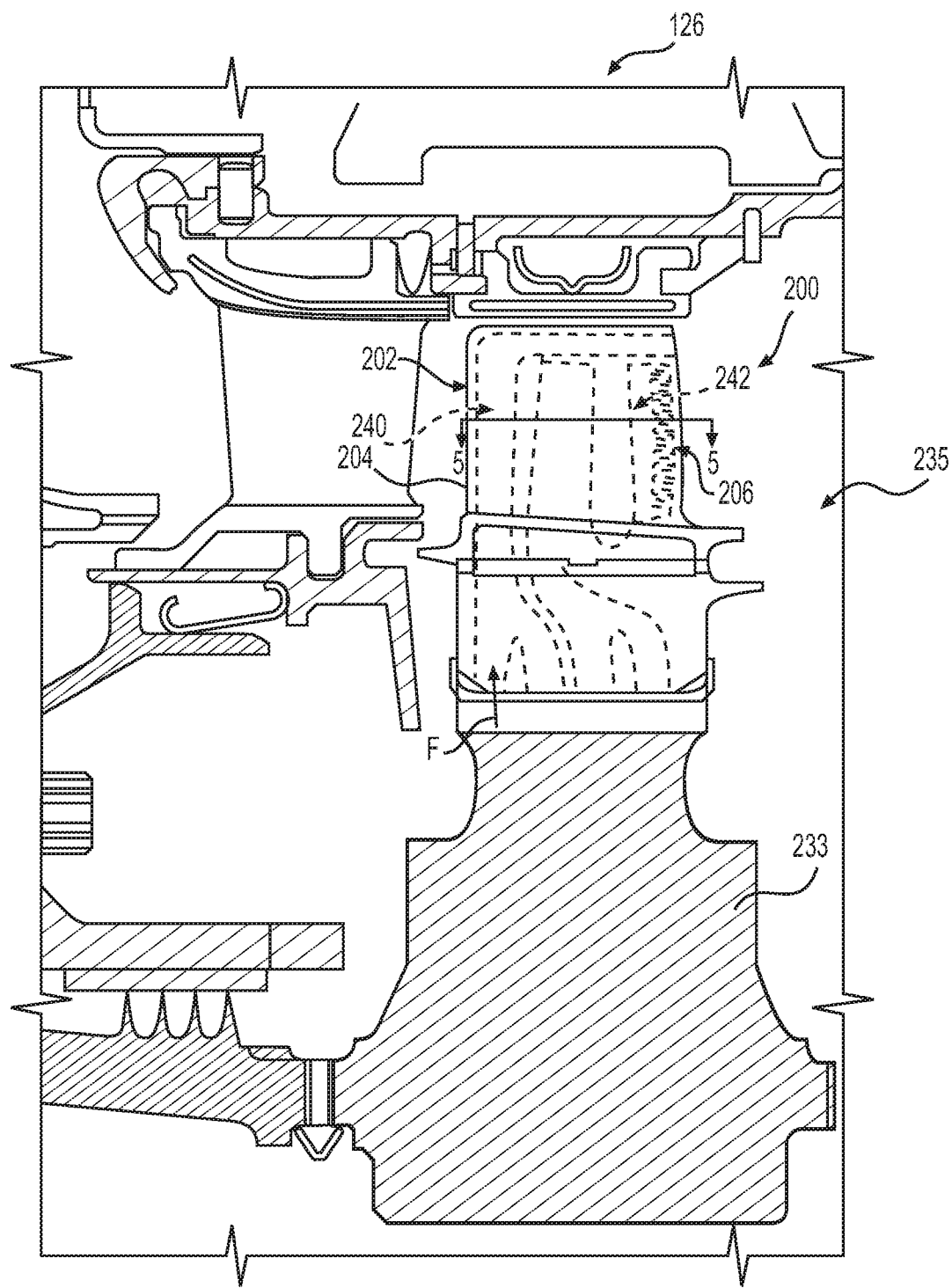
FIG. 2 is a detail cross-sectional view of the gas turbine engine of FIG. 1, taken at 2 of FIG. 1, which illustrates the turbine blade that includes the dust tolerant cooling system.

With reference to FIG. 2, a portion of the high pressure turbine 126 of the gas turbine engine 100 of FIG. 1 is shown in greater detail. In this example, the dust tolerant cooling system 202 is employed with airfoils 206 associated with the turbine blades 200 of a turbine rotor 235 of the high pressure turbine 126. As discussed, the dust tolerant cooling system 202 provides for improved cooling for the respective leading edges 204 of the airfoils 206 by increasing heat transfer between the leading edge 204 and the cooling fluid F while reducing the accumulation of fine sand and dust particles.

Figure 2A:
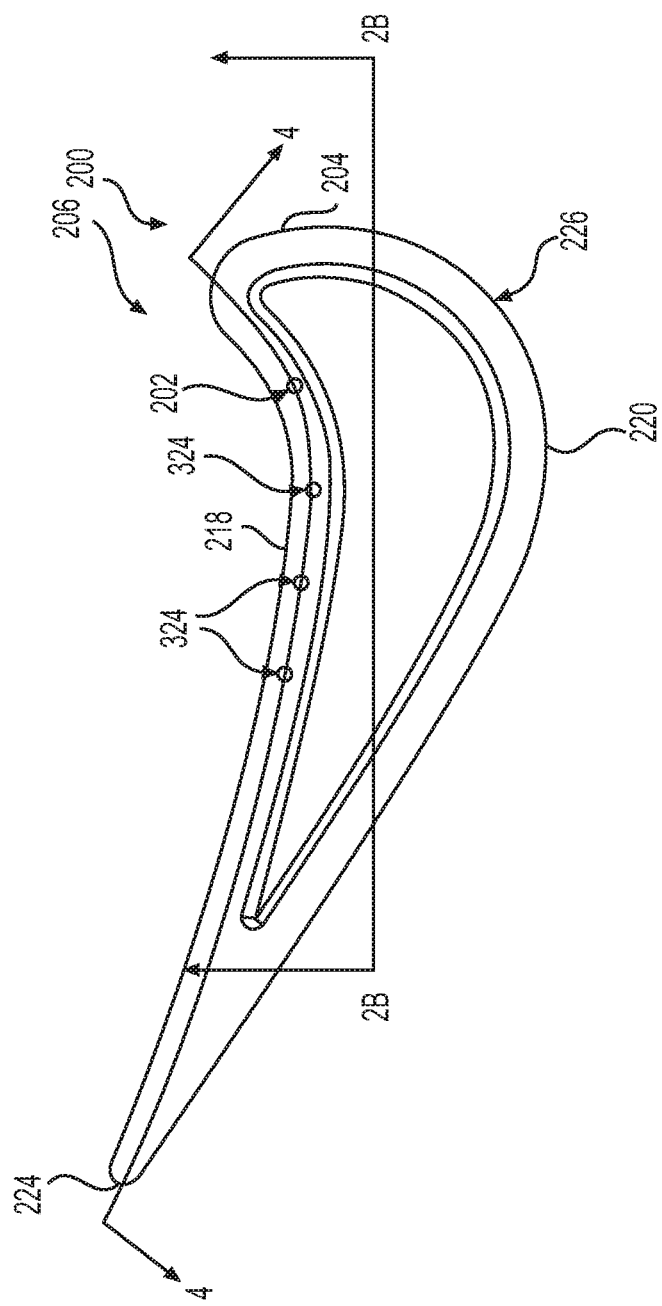
FIG. 2A is a top view of the turbine blade of FIG. 2, which is rotated 180 degrees.
Figure 3:
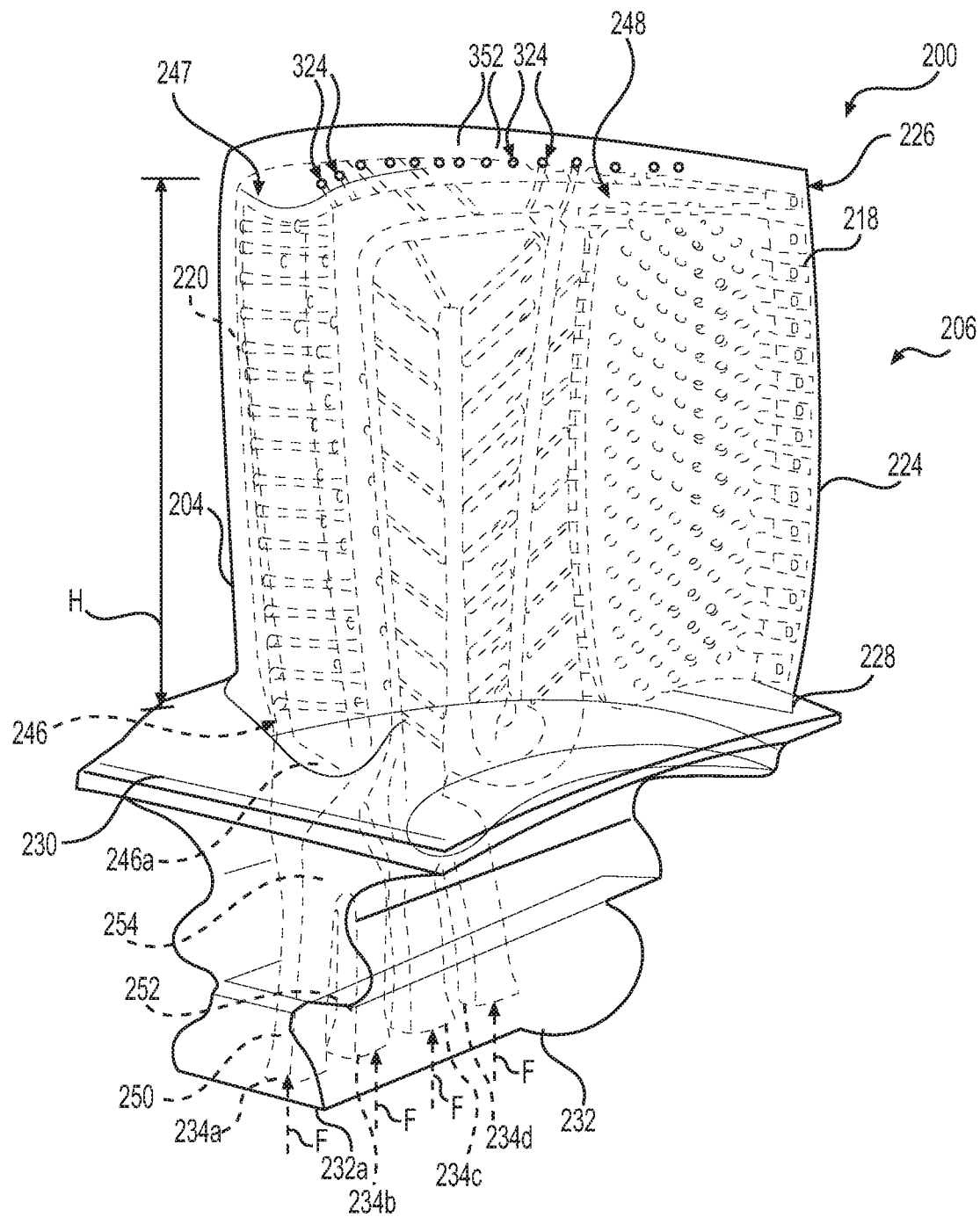
FIG. 3 is a perspective view of the turbine blade of FIG. 2.

Referring to FIG. 2A, a top view of the turbine blade 200 is shown rotated 180 degrees from the orientation of the turbine blade 200 in FIG. 2. With reference to FIG. 3, a perspective view of the turbine blade 200 is shown. The turbine blade 200 includes the airfoil 206. The airfoil 206 has a generally concave pressure side or sidewall 218 and an opposite, generally convex suction side or sidewall 220. The pressure and suction sidewalls 218, 220 interconnect the leading edge 204 and a trailing edge 224 (FIG. 2) of the airfoil 206. The airfoil 206 includes a tip 226 and an airfoil root 228, which are spaced apart by a height H of the airfoil 206 or in a spanwise direction. In the illustrated example, the turbine blade 200 further includes a platform 230 and a root 232, which is partially shown and joined to the platform 230 opposite the airfoil 206. In certain embodiments, the turbine blade 200 may be a discrete, insert-type blade piece, and the root 232 may be imparted with an interlocking shape (e.g. fir-tree or dovetail) for mating insertion into a corresponding slot provided in a separately-fabricated rotor hub 233 (FIG. 2). In other embodiments, the turbine blade 200 may assume various other forms such that the airfoil 206 is integrally formed with or otherwise joined to a rotor hub as, for example, a bladed disk (blisk). It should be understood that while a single turbine blade 200 is shown, the high pressure turbine 126 generally includes a plurality of turbine blades 200, each of which is coupled to the hub 233 (FIG. 2) to form the turbine rotor 235 and includes the dust tolerant cooling system 202.

In one example, as will be discussed in further detail below, the dust tolerant cooling system 202 is defined between the pressure and suction sidewalls 218, 220 along the leading edge 204 of the airfoil 206, and extends along the tip 226 of the airfoil 206 (FIG. 2A). In this example, the turbine blade 200 is a bottom-fed airfoil, such that cooling fluid F is received through at least one or a plurality of inlets 234 defined in a bottom surface 232a (e.g. a surface of the root 232 opposite of the airfoil root 228 of the airfoil 206). Alternatively, the turbine blade 200 may comprise a forward-fed airfoil, in which the cooling fluid F is received through an inlet defined through the root 232 at a front or near the leading edge 204 of the airfoil 206, such that the cooling fluid F is received into the airfoil 206 from the airfoil root 228 near the leading edge 204 of the airfoil 206 (i.e. forward-fed airfoil).

Figure 4:
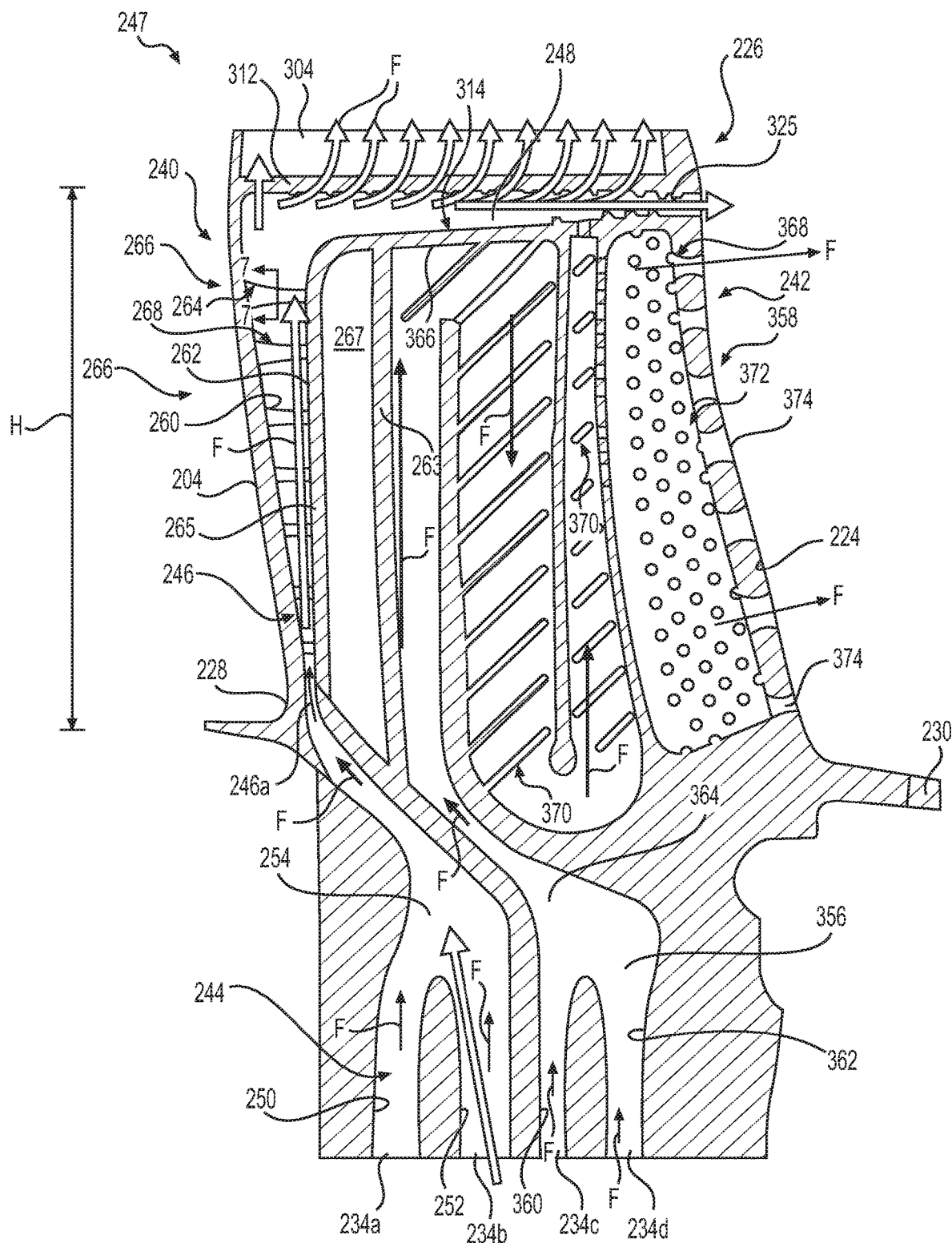
FIG. 4 is a cross-sectional view taken along line 4-4 of FIG. 2A rotated 180 degrees, which illustrates the dust tolerant cooling system of the turbine blade in accordance with various embodiments.

In the example of a bottom-fed turbine blade 200, with reference to FIG. 4, the dust tolerant cooling system 202 is defined through the root 232, the platform 230 and between the pressure and suction sidewalls 218, 220 of the airfoil 206. In this example, the dust tolerant cooling system 202 includes a first, leading edge conduit or first conduit 240 and a second, trailing edge conduit or second conduit 242 (FIG. 2). The first conduit 240 is in fluid communication with a source of the cooling fluid F via a first pair of the inlets 234a, 234b to cool the leading edge 204 and the tip 226 of the airfoil 206, and the second conduit 242 is in fluid communication with the source of the cooling fluid F via a second pair of the inlets 234c, 234d to cool the airfoil 206 downstream of the leading edge 204 to the trailing edge 224. Thus, the first conduit 240 is in proximity to the leading edge 204 to cool the leading edge 204, and the first conduit 240 extends from the leading edge 204 to the trailing edge 224 along the tip 226 of the airfoil 206 to cool the tip 226 of the airfoil 206. The second conduit 242 extends downstream of the leading edge 204 to cool the remainder of the airfoil 206 to the trailing edge 224. In one example, the source of the cooling fluid F may comprise flow from the high pressure compressor 122 (FIG. 1) exit discharge air. It should be noted, however, that the cooling fluid F may be received from other suitable sources associated with the gas turbine engine 100.

In one example, with continued reference to FIG. 4, the first conduit 240 includes a first platform flow passage 244, a leading edge cooling circuit or leading edge flow passage 246 and a tip region 247 that includes a tip flag channel or tip flow passage 248. In this example, the first platform flow passage 244 includes a first branch 250 and a second branch 252, which converge into a single inlet branch 254 before the platform 230. The first branch 250 is in fluid communication with the inlet 234a to receive the cooling fluid F from the source of the cooling fluid F, and the second branch 252 is in fluid communication with the inlet 234b to receive the cooling fluid F from the source of the cooling fluid F. The single inlet branch 254 receives the cooling fluid F from the first branch 250 and the second branch 252, and directs the cooling fluid F into a leading edge inlet 246a of the leading edge flow passage 246. Thus, the first platform flow passage 244 is in fluid communication with the leading edge flow passage 246.

The leading edge flow passage 246 extends from the leading edge inlet 246a at the airfoil root 228 to the tip flow passage 248. The leading edge flow passage 246 includes a first surface 260, a second surface 262 and a plurality of cooling features 264. The first surface 260 and the second surface 262 cooperate to define the leading edge flow passage 246 within the airfoil 206. The first surface 260 is opposite the leading edge 204, and extends along the airfoil 206 from the tip 226 to the airfoil root 228. In one example, with reference to FIG. 5, the airfoil 206 includes an inner wall 263 that separates the first conduit 240 from the second conduit 242. In this example, the airfoil 206 also includes a curved spacer wall 265, which cooperates with the inner wall 263 to form a chamber 267. The inner wall 263 extends from an inner surface 218.1 of the pressure sidewall 218 to an inner surface 220.1 of the suction sidewall 220. The curved spacer wall 265 defines the second surface 262, and includes a third surface 269 opposite the second surface 262. The third surface 269 cooperates with a surface 263a of the inner wall 263 to define the chamber 267. In one example, the chamber 267 may not include a flow of the cooling fluid F or may be stagnant, and in another example, the chamber 267 may be in fluid communication with one of the inlets 234a-234d to receive a flow of the cooling fluid F. It should be noted that the curved spacer wall 265 and the chamber 267 may be optional.

Figure 5:
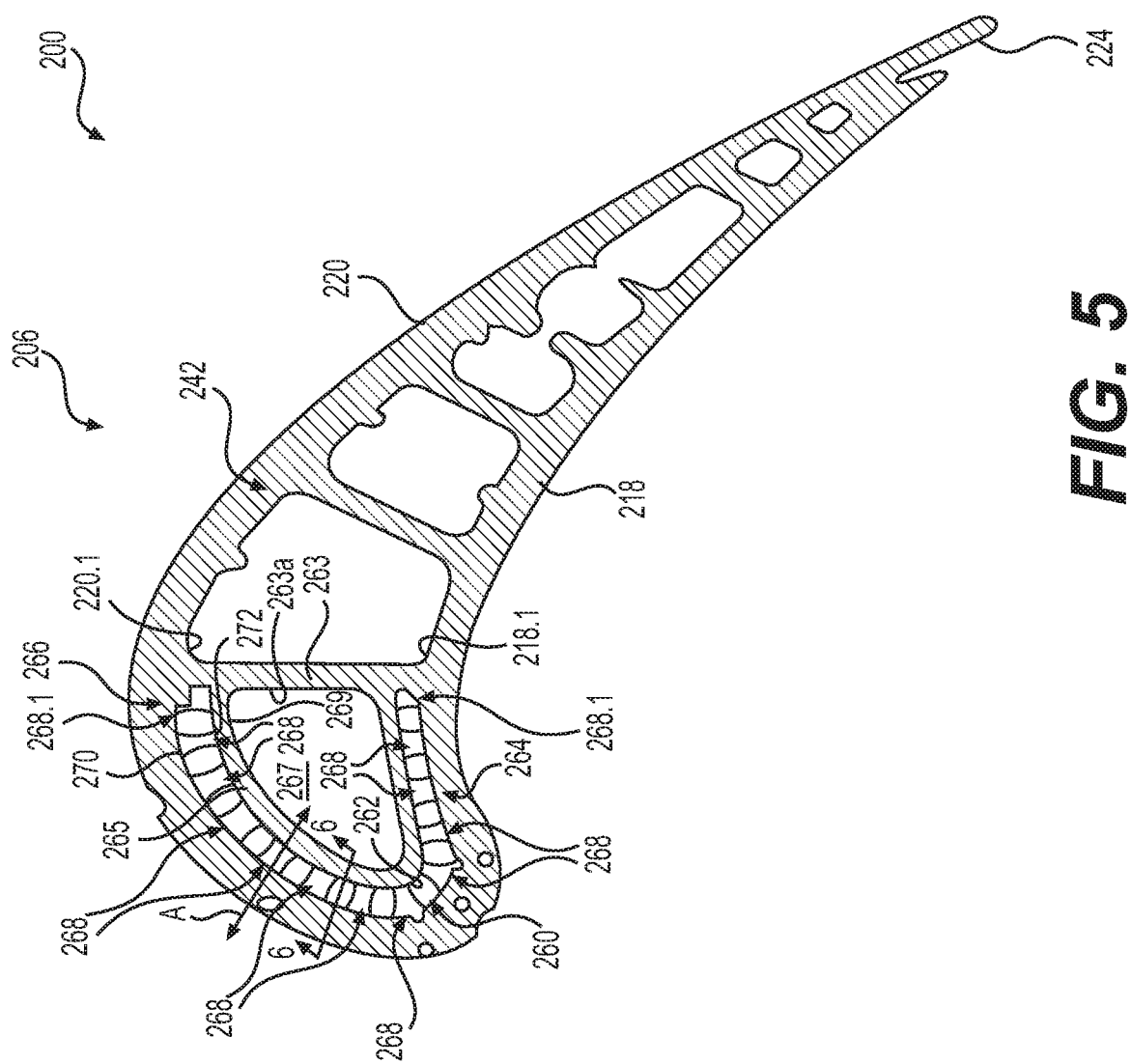
FIG. 5 is a cross-sectional view taken along line 5-5 of FIG. 2, which illustrates a plurality of cooling features disposed within a first conduit of the dust tolerant cooling system of the turbine blade of FIG. 2.

In one example, with additional reference to FIG. 4, the plurality of cooling features 264 are arranged in sub-pluralities or rows 266 that are spaced apart radially relative to the longitudinal axis 140 of the gas turbine engine 100 within the leading edge flow passage 246 from the airfoil root 228 to the tip 226 of the airfoil 206. Stated another way, sub-pluralities of the plurality of cooling features 264 are spaced apart radially along the height H of the airfoil 206 within the leading edge flow passage 246. Depending on the size of the turbine blade 200, the number of rows 266 of the plurality of cooling features 264 may be between about 4 to about 20. In other embodiments, the number of rows 266 of plurality of cooling features 264 may be greater than about 20 or less than about 4. As shown in FIG. 5, in one example, each row 266 of the plurality of cooling features 264 includes a plurality of cooling pins 268. In this example, each row 266 includes about 3 to about 11 cooling pins 268 and includes about two half cooling pins 268.1. The half cooling pins 268.1 comprise one-half of the cooling pin 268 cut along a central axis A of the cooling pin 268. It should be noted that instead of two half cooling pins 268.1, a single cooling pin 268 may be employed. Each of the cooling pins 268 extends from the first surface 260 to the second surface 262 to facilitate convective heat transfer between the cooling fluid F and the leading edge 204, while reducing the accumulation of fine sand and dust particles. In this example, each of the half cooling pins 268.1 extends from the first surface 260 and extends along the second surface 262 of the inner wall 263 to facilitate heat transfer. In other embodiments, the number of cooling pins 268 in each row 266 may be less than 3 or more than 11.

Figure 6:
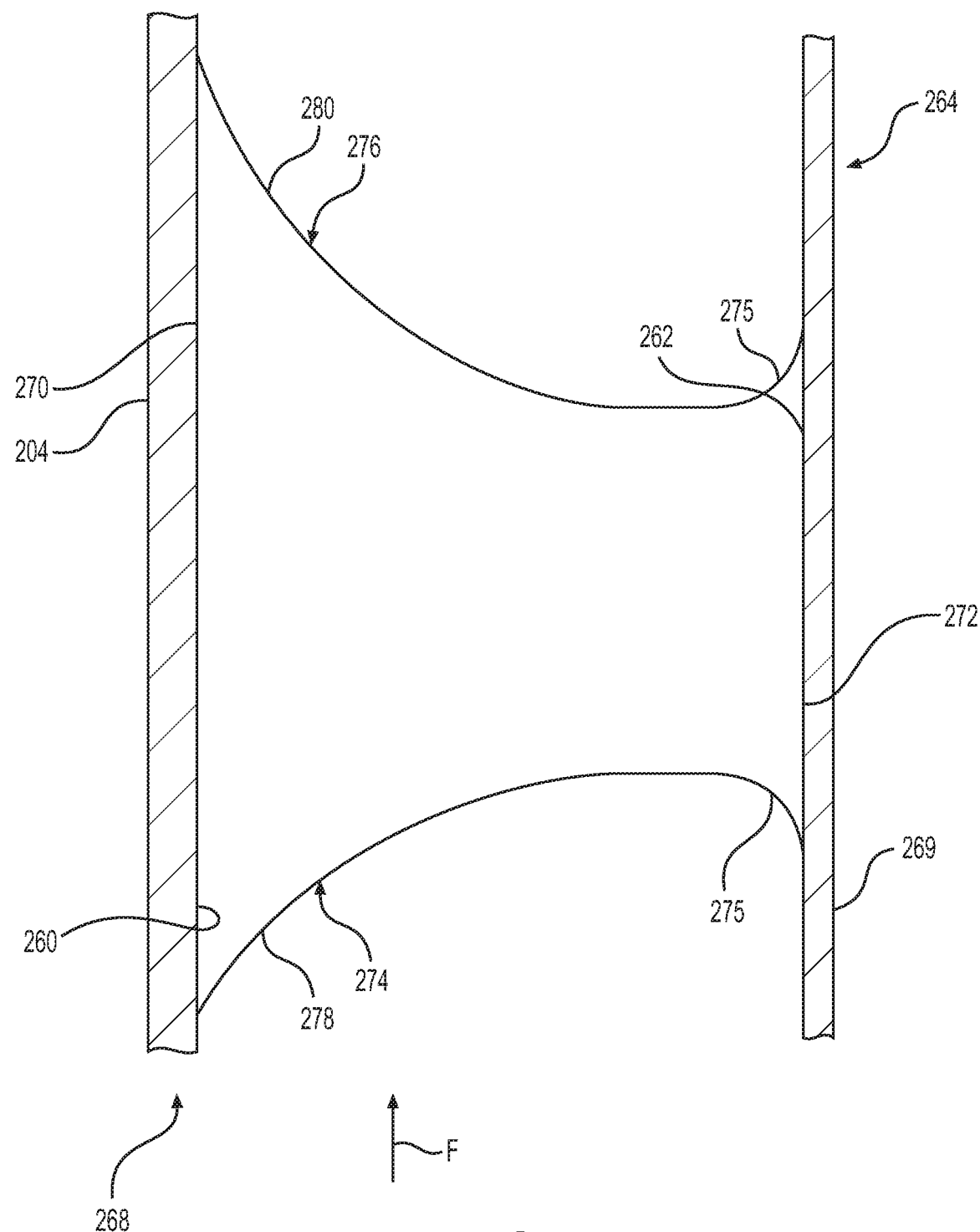
FIG. 6 is a cross-sectional view taken along line 6-6 of FIG. 5, which illustrates a side view of one of the plurality of cooling features of the dust tolerant cooling system of FIG. 5.

With reference to FIG. 6, each cooling pin 268 includes a first pin end 270, and an opposite second pin end 272. The first pin end 270 is coupled to or integrally formed with the first surface 260 and the second pin end 272 is coupled to or integrally formed with the second surface 262. In one example, each cooling pin 268 also includes a first fillet 274 and a second fillet 276. In this example, the first fillet 274 is defined along a first, bottom surface 278 of the cooling pin 268, while the second fillet 276 is defined along an opposite, second, top surface 280 of the cooling pin 268. The first fillet 274 is defined along the bottom surface 278 at the first pin end 270 to extend toward the second pin end 272, and has a greater fillet arc than the second fillet 276. The second fillet 276 is defined along the top surface 280 at the first pin end 270 to extend toward the second pin end 272. The first fillet 274 and the second fillet 276 are predetermined based on an optimization of the fluid mechanics, heat transfer, and stress concentrations in the cooling pin 268 as is known to one skilled in the art. Such fluid mechanics and heat transfer methods may include utilizing a suitable commercially available computational fluid dynamics conjugate code such as STAR CCM+, commercially available from Siemens AG. Stress analyses may be performed using a commercially available finite element code such as ANSYS, commercially available from Ansys, Inc. To minimize dust accumulation on the upstream first fillet 274, the first fillet 274 may be larger than the second fillet 276. In some embodiments, the first fillet 274 may be about 10% to about 100% larger than the second fillet 276. However, in other embodiments, results from the optimization analyses based on fluid mechanics, heat transfer, and stress analyses may require that first fillet 274 be equal to the second fillet 276 or less than the second fillet 276. In addition, small fillets 275 are also employed to minimize stress concentrations at the interface between the cooling pin 268 and the second surface 262. The small fillets 275 may be between about 0.005 inches (in.) and about 0.025 inches (in.) depending on the size of the turbine blade 200. By providing the first fillet 274 with a larger fillet arc at the first pin end 270, a vorticity in the cooling fluid F is increased and conduction from the leading edge 204 is improved.

Figure 7:
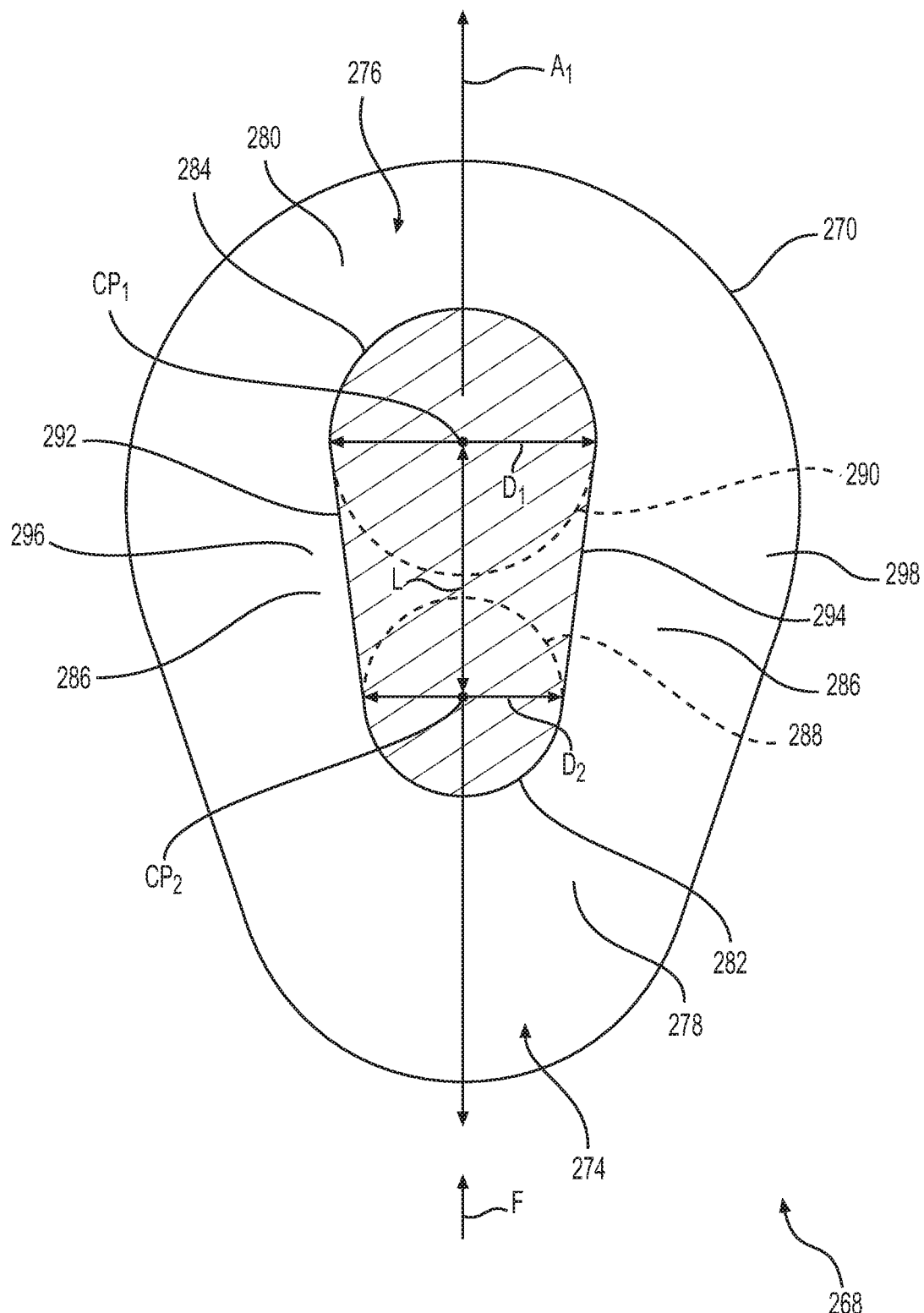
FIG. 7 is a cross-sectional view taken along line 7-7 of FIG. 4, which illustrates a cross-section of one of the plurality of cooling features.

With reference to FIG. 7, an end view of one of the cooling pins 268 taken from the second pin end 272 is shown. As can be appreciated, each of the cooling pins 268 are the same, and thus, only one of the cooling pins 268 will be described in detail herein. In this example, the cooling pin 268 has the bottom surface 278 and the top surface 280 that extend along an axis A1. The bottom surface 278 is upstream from the top surface 280 in the cooling fluid F. Stated another way, the bottom surface 278 faces the inlet 234 (FIG. 2) so as to be positioned upstream in the cooling fluid F. The bottom surface 278 has a first curved surface 282 defined by a minor diameter $D_2$, and the top surface 280 has a second curved surface 284 defined by a major diameter $D_1$. The minor diameter $D_2$ is smaller than the major diameter $D_1$. In one example, the minor diameter $D_2$ is about 0.010 inches (in.) to about 0.050 inches (in.); and the major diameter $D_1$ is about 0.015 inches (in.) to about 0.075 inches (in.). The center of minor diameter $D_2$ is spaced apart from the center of major diameter $D_1$ by a length L. In one example, the length L is about 0.005 inches (in.) to about 0.150 inches (in.). The first curved surface 282 and the second curved surface 284 are interconnected by a pair of surfaces 286 that are defined by a pair of planes that are substantially tangent to a respective one of the first curved surface 282 and the second curved surface 284. It should be noted, however, that the first curved surface 282 and the second curved surface 284 need not be interconnected by a pair of planes that are substantially tangent to a respective one of the first curved surface 282 and the second curved surface 284. Rather, the first curved surface 282 and the second curved surface 284 may be interconnected by a pair of straight, concave, convex, or other shaped surfaces.

Generally, the shape of the cooling pin 268 is defined in cross-section by a first circle 288, a second circle 290 and a pair of tangent lines 292, 294. As the shape of the cooling pin 268 in cross-section is substantially the same as the shape of the each of the plurality of shaped cooling pins 262 of commonly assigned U.S. application Ser. No. 15/475,597, filed Mar. 31, 2017, to Benjamin Dosland Kamrath et. al., the relevant portion of which is incorporated herein by reference, the cross-sectional shape of the cooling pin 268 will not be discussed in detail herein. Briefly, the first circle 288 defines the first curved surface 282 at the bottom surface 278 and has the minor diameter $D_2$. The second circle 290 defines the second curved surface 284 at the top surface 280 and has the major diameter $D_1$. The first circle 288 includes a second center point $CP_2$, and the second circle 290 includes a first center point $CP_1$. The first center point $CP_1$ is spaced apart from the second center point $CP_2$ by the length L. The length L is greater than zero. Thus, the first curved surface 282 is spaced apart from the second curved surface 284 by the length L.

The tangent lines 292, 294 interconnect the first curved surface 282 and the second curved surface 284. Generally, the tangent line 292 touches the first curved surface 282 and the second curved surface 284 on a first side 296 of the cooling pin 268. The tangent line 294 touches the first curved surface 282 and the second curved surface 284 on a second side 298 of the cooling pin 268. By having the bottom surface 278 of the cooling pin 268 formed with the minor diameter $D_2$, the reduced diameter of the bottom surface 278 minimizes an accumulation of fine sand and dust particles in the stagnation region on the bottom surface 278 of the cooling pin 268.

It will be understood that the cooling features 264 associated with the leading edge flow passage 246 described with regard to FIGS. 4-7 may be configured differently to provide improved cooling of the leading edge 204 within the leading edge flow passage 246. In one example, the leading edge flow passage 246 may include any one or combination of the plurality of cooling features 344, 444, 544 disclosed in commonly-assigned U.S. patent application Ser. No. 16/035,173 to Steven Whitaker, et al., the relevant portion of which is incorporated herein by reference.

With reference back to FIG. 3, the tip region 247 including the tip flow passage 248 is in communication with the leading edge flow passage 246 to receive the cooling fluid F. In one example, the leading edge flow passage 246 directs the cooling fluid F radially into the tip flow passage 248. The tip region 247 including the tip flow passage 248 extends from the leading edge 204 to the trailing edge 224 along the tip 226 of the airfoil 206. With reference to FIG. 8, the tip 226 of the airfoil 206 and the tip flow passage 248 are shown in greater detail. In this example, the tip 226 of the airfoil 206 includes a tip cap (or tip wall) 300 and squealer tip extensions (or parapet walls) 302, 304. In one example, the tip cap 300 extends between the squealer tip extensions 302, 304 from the leading edge 204 to the trailing edge 224. Generally, the tip cap 300 is recessed relative to the squealer tip extensions 302, 304, such that the squealer tip extensions 302, 304 extend for a distance above the tip cap 300. In this example, the squealer tip extensions 302, 304 are defined by portions of the pressure sidewall 218 and the suction sidewall 220 that extend radially beyond the tip cap 300. The pressure side squealer tip extension 302 includes a first or exterior tip wall 306, a second or interior wall 308 and a third or tip wall 310. As will be discussed, a portion of the tip flow passage 248 is defined through the pressure side squealer tip extension 302.

In one example, a portion of the tip flow passage 248 is defined by a top cavity wall 312, the inner surface 218.1 of the pressure sidewall 218, the inner surface 220.1 of the suction sidewall 220 and a bottom cavity wall 314. The top cavity wall 312 extends from the leading edge 204 to the trailing edge 224, and is opposite the tip cap 300 of the airfoil 206. The top cavity wall 312 bounds the tip flow passage 248, and extends from the pressure sidewall 218 to the suction sidewall 220 at an angle α, which assists in guiding the cooling fluid F into one of a plurality of tip dust holes 324. The angle α is defined between the top cavity wall 312 and a horizontal reference line RL extending from the inner surface 220.1 of the suction sidewall 220 to the inner surface 218.1 of the pressure sidewall 218. In one example, angle α is a positive angle, and is between about 2 degrees to about 20 degrees. The angled top cavity wall 312 enables a centrifugal load acting on the fine sand and dust particles to drive the fine sand and dust particles entrained in the cooling fluid F into the respective tip dust hole 324. The inner surface 218.1 of the pressure sidewall 218 and the inner surface 220.1 of the suction sidewall 220 interconnect the top cavity wall 312 and the bottom cavity wall 314. The top cavity wall 312 faces the bottom cavity wall 314. The bottom cavity wall 314 is generally planar; however, the bottom cavity wall 314 may have any desired shape.

Figure 2B:
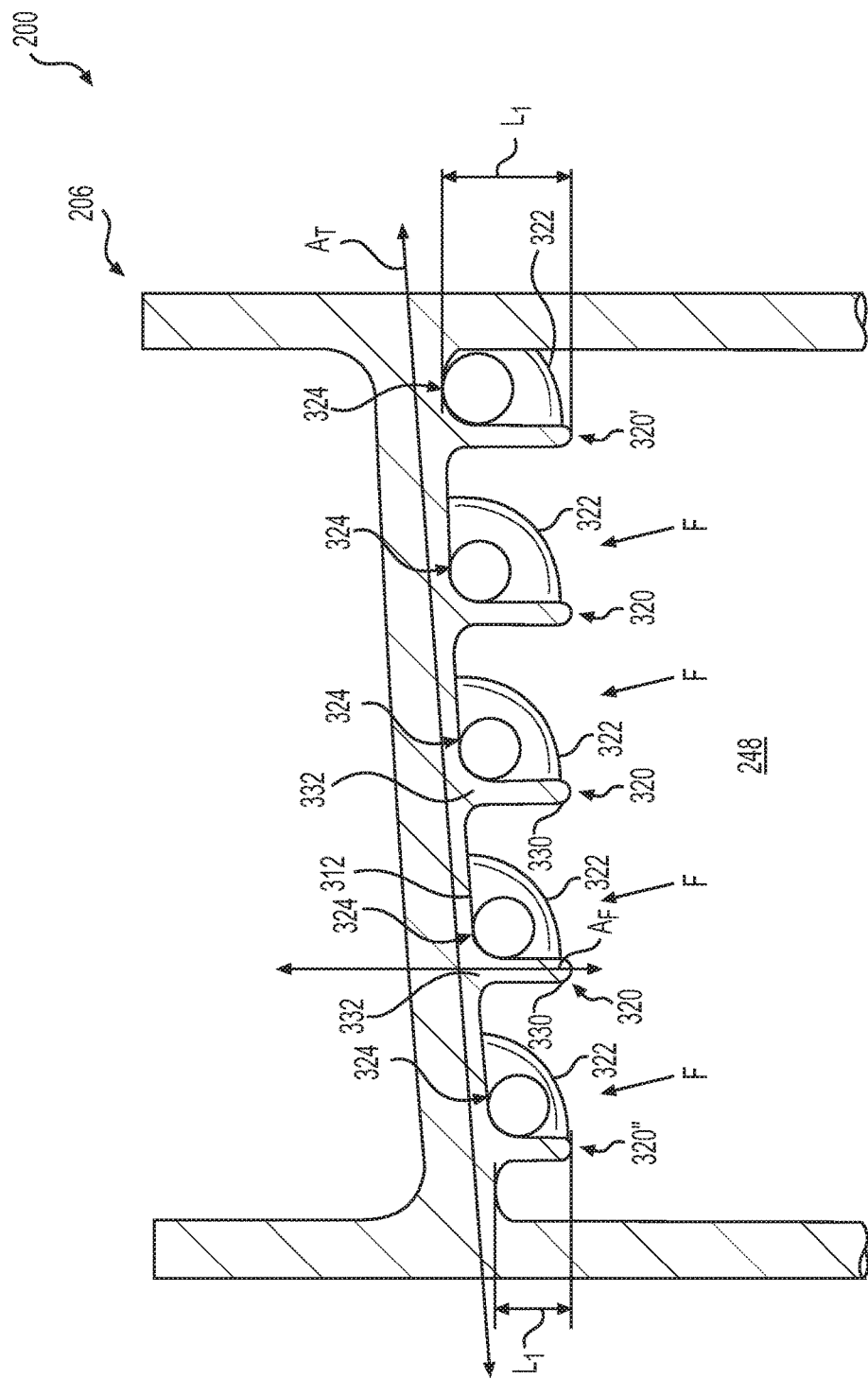
FIG. 2B is a cross-sectional view of the turbine blade of FIG. 2, taken along line 2B-2B of FIG. 2A on a suction sidewall of the turbine blade.
Figure 2C:
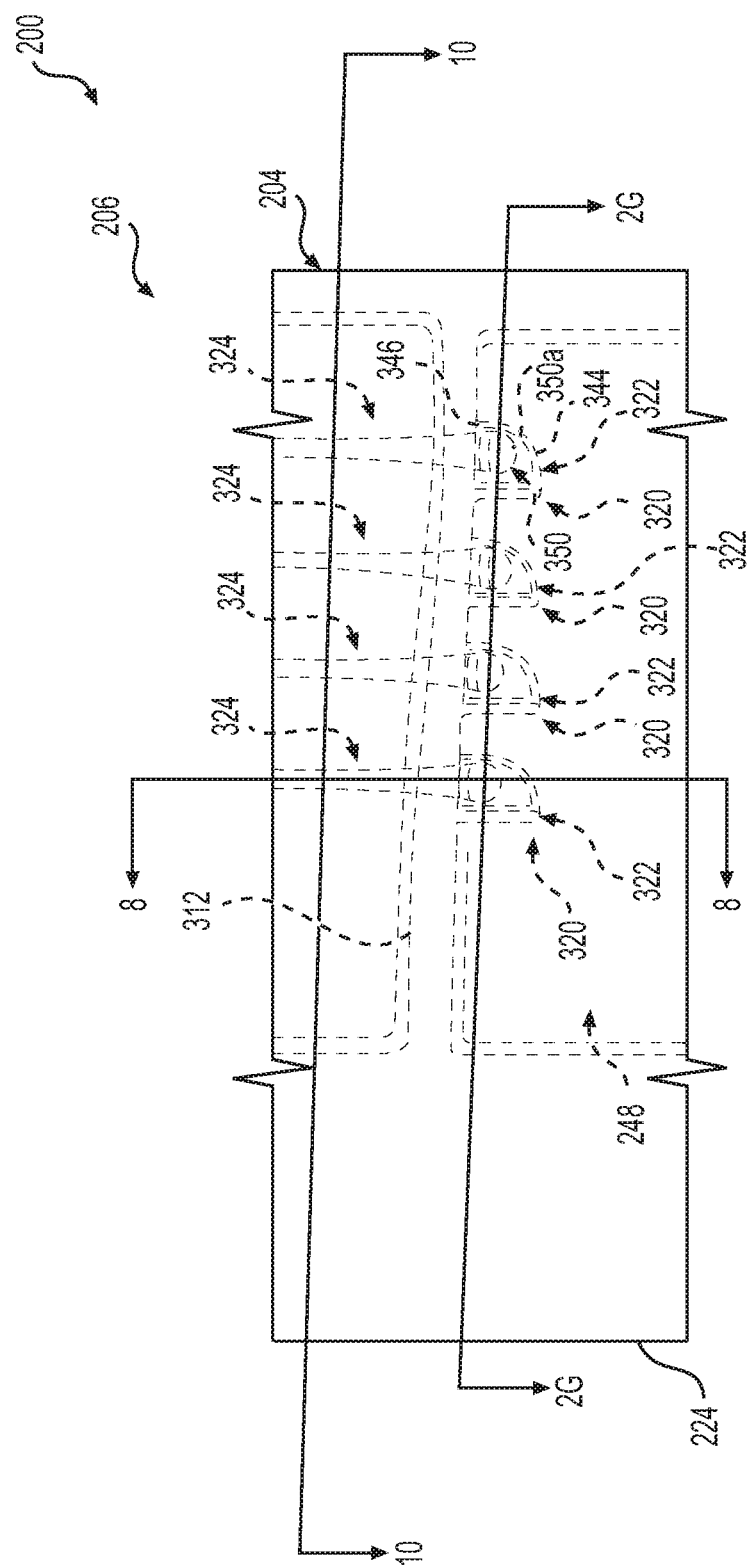
FIG. 2C is a side view of the suction sidewall of the turbine blade of FIG. 2.
Figure 2E:
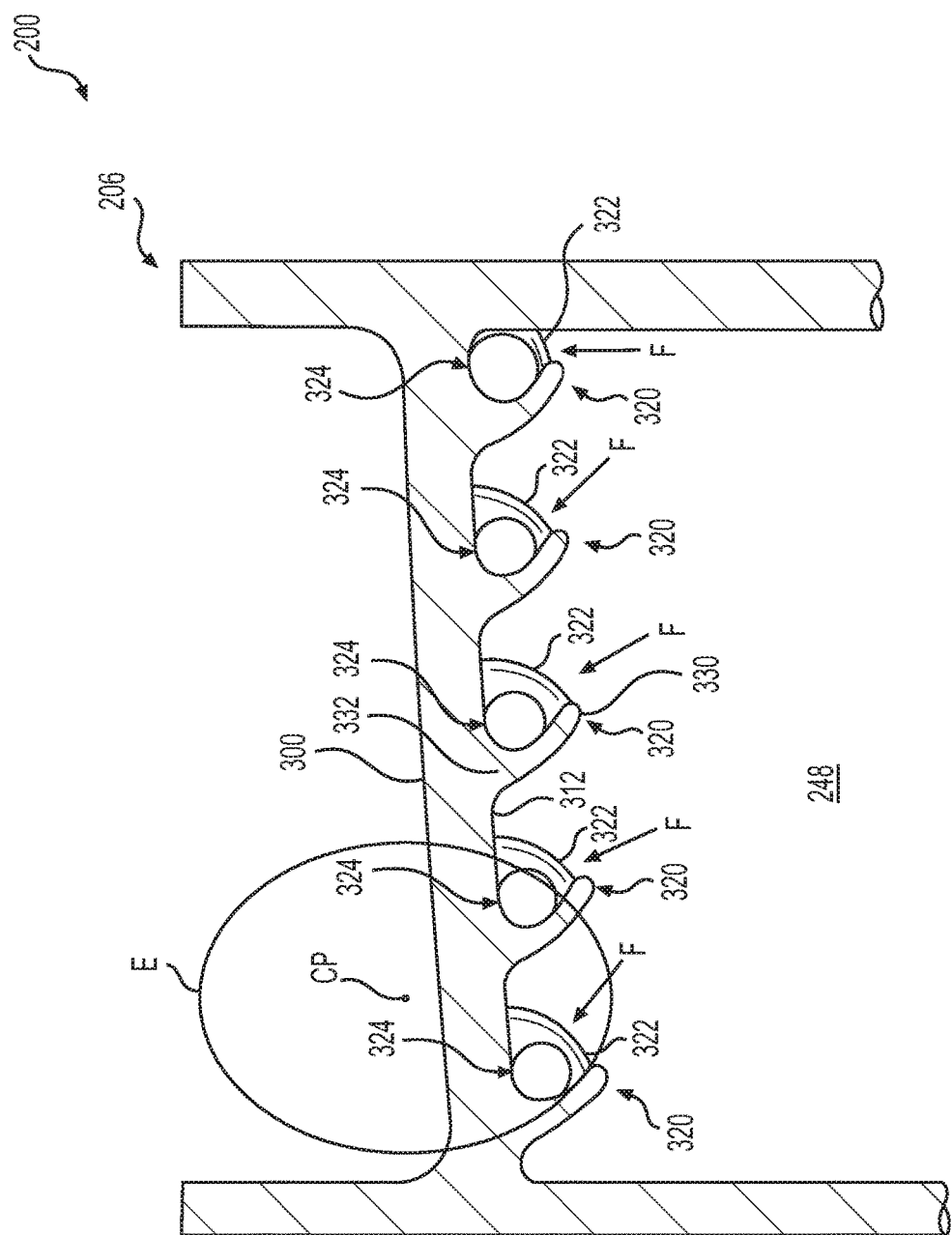
FIG. 2E is a cross-sectional view of the turbine blade of FIG. 2 in accordance with an exemplary embodiment, taken along the perspective of line 2B-2B of FIG. 2A, in which flow directing ribs of the dust tolerant cooling system extend along a curve relative to a top wall of a tip flag channel of the turbine blade.
Figure 2F:
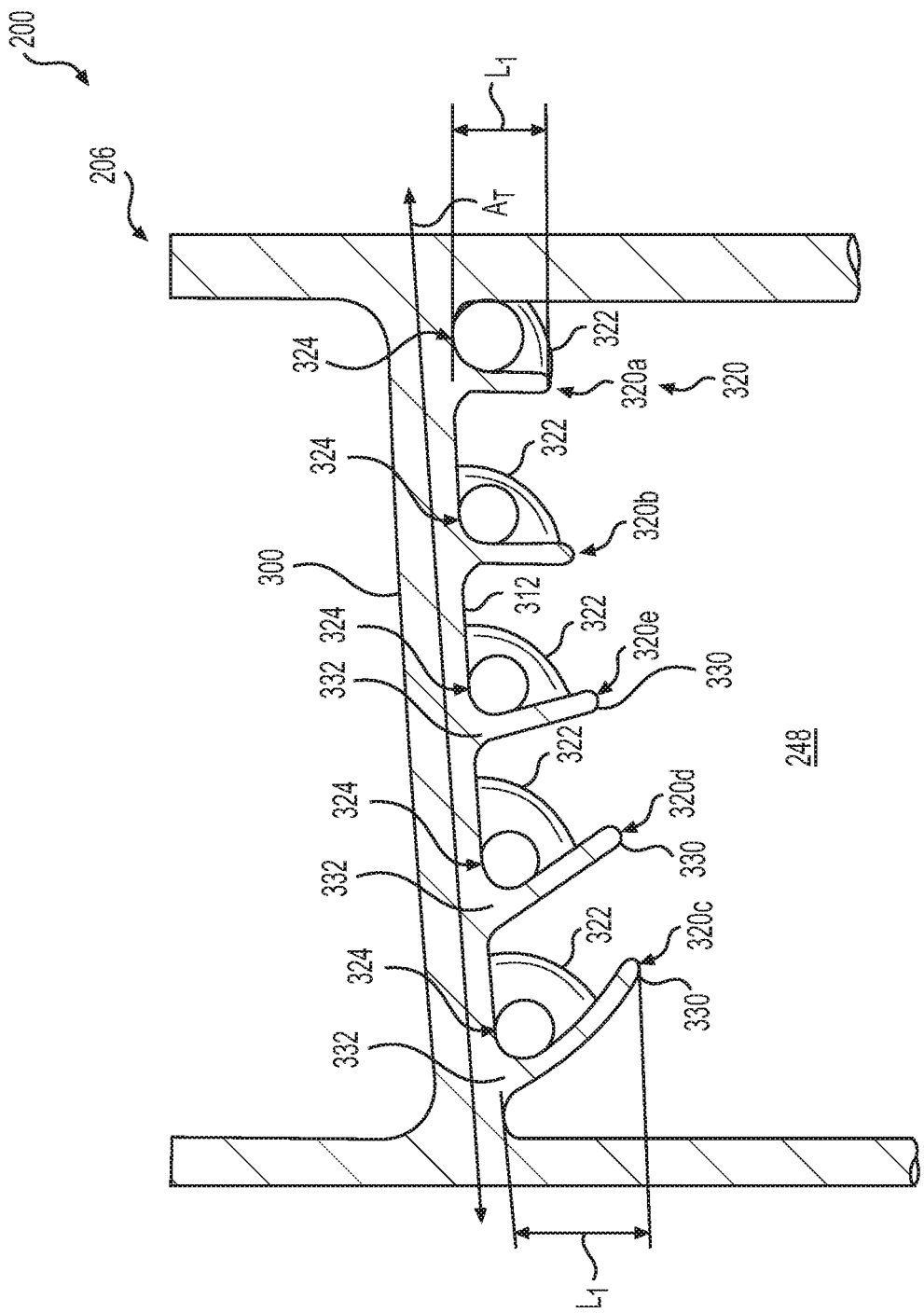
FIG. 2F is a cross-sectional view of the turbine blade of FIG. 2 in accordance with an exemplary embodiment, taken along the perspective of line 2B-2B of FIG. 2A, in which flow directing ribs of the dust tolerant cooling system extend at various orientations relative to a top wall of a tip flag channel of the turbine blade.
Figure 2G:
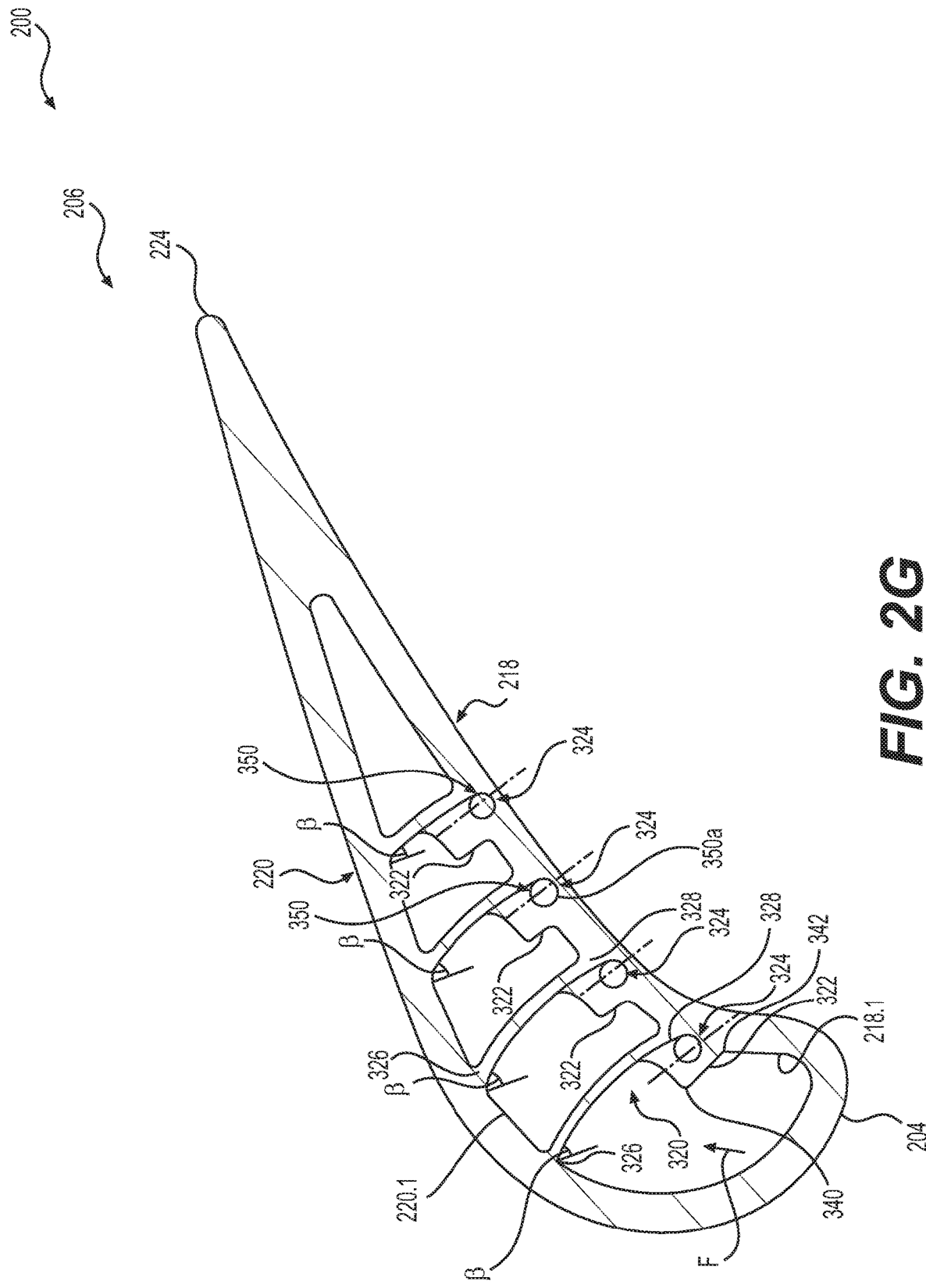
FIG. 2G is a cross-sectional view of the turbine blade of FIG. 2, taken along line 2G-2G of FIG. 2C.

In this example, with reference to FIG. 2B, the tip flow passage 248 includes a plurality of flow directing ribs 320, a plurality of flow scoops 322 and the plurality of tip dust holes 324. Each of the flow directing ribs 320 are defined on the top cavity wall 312; each of the flow scoops 322 are defined from the respective one of the flow directing ribs 320 at the top cavity wall 312 and along the inner surface 218.1; and each of the tip dust holes 324 are defined through the pressure side squealer tip extension 302. The flow directing ribs 320 cooperate with the flow scoops 322 to direct air, including entrained fine sand and dust particles, into the tip dust holes 324, and thus, out of the airfoil 206. In one example, with reference to FIG. 2C, for each tip dust hole 324, there is a respective flow directing rib 320 and flow scoop 322 associated with the particular tip dust hole 324. With reference to FIG. 2G, depending upon the size of the airfoil 206, the airfoil 206 may include about 3 to about 10 flow directing ribs 320, flow scoops 322 and tip dust holes 324 that are spaced apart along the pressure sidewall 218 from the leading edge 204 to the trailing edge 224. Other embodiments may include fewer than 3 or more than 10 flow directing ribs 320, flow scoops 322 and tip dust holes 324. By providing the flow directing ribs 320 and the flow scoops 322, fine sand and dust particles entrained in the cooling fluid F are directed out of the airfoil 206 through the tip dust holes 324, thereby reducing an accumulation of fine sand and dust particles within the airfoil 206. This increases a longevity of the airfoil 206, while ensuring proper cooling fluid F flow through the airfoil 206. With reference to FIG. 4, a remainder of the cooling fluid F exits the tip flow passage 248 through a slot 325 defined at the trailing edge 224.

With reference back to FIG. 8, each of the flow directing ribs 320 extend outward from the top cavity wall 312 in a direction toward the bottom cavity wall 314. Stated another way, each of the flow directing ribs 320 protrude from the top cavity wall 312 so as to extend into the tip flow passage 248. Generally, each of the flow directing ribs 320 has a first end 326 and an opposite second end 328, and a first side 330 opposite a second side 332. The first end 326 is defined on the top cavity wall 312 at or proximate to the inner surface 220.1 of the suction sidewall 220. The second end 328 is defined at or proximate the inner surface 218.1 of the pressure sidewall 218 within the respective flow scoop 322. Thus, each of the flow directing ribs 320 merge with the respective flow scoop 322 to form an integral or one-piece flow directing or blocking structure that guides the entrained fine sand and dust particles within the cooling fluid F into the respective tip dust hole 324. The first side 330 extends into the tip flow passage 248, while the second side 332 is coupled to the top cavity wall 312. In one example, the first side 330 extends from the first end 326 to the second end 328 at an angle α3, which assists in guiding the cooling fluid F into the respective one of the tip dust holes 324. The angle α3 is defined between the horizontal reference line RL extending from the inner surface 220.1 of the suction sidewall 220 to the inner surface 218.1 of the pressure sidewall 218 and the first side 330. In one example, angle α3 is a negative angle, and is between about 2 degrees to about 20 degrees. Generally, by providing each of the flow directing ribs 320 with the first side 330 that extends at the angle α3, each of the flow directing ribs 320 has a width WF1 at the first end 326, which is different and less than a width WF2 at the second end 328. This ensures that each of the flow directing ribs 320 does not overly restrict the flow of the cooling fluid F flowing in the tip flow passage 248.

In one example, with reference to FIG. 2G, each of the flow directing ribs 320 extends from the first end 326 to the second end 328 at an angle β, which guides the cooling fluid F, including the entrained particles, along the angled top cavity wall 312 (FIG. 8) into the respective tip dust hole 324. Stated another way, each of flow directing ribs 320 is angled along the top cavity wall 312 from the inner surface 220.1 to the inner surface 218.1, and defines a flow directing or blocking protrusion that guides the fine sand and dust particles into the respective tip dust hole 324. In one example, the angle β is a positive angle, and is between about 30 degrees to about 60 degrees. Generally, the angle β is greater than the angle α. It should be noted that the angle β associated with each of the flow directing ribs 320 may vary within the airfoil 206 such that the angle β need not be the same for each of the flow directing ribs 320, if desired.

With reference to FIG. 2B, each of the flow directing ribs 320 has a length L1, which is defined between the first side 330 and the second side 332. In the example of FIG. 2B, the length L1 of each of the flow directing ribs 320 varies from the leading edge 204 to the trailing edge 224. In this example, the length L1 of a flow directing rib 320' proximate the leading edge 204 is greater than the length L1 of a flow directing rib 320" at proximate the trailing edge 224, with the length L1 of the flow directing ribs 320 between the flow directing rib 320' and the flow directing rib 320" decreasing from the flow directing rib 320' to the flow directing rib 320". In one example, the first side 330 of the flow directing ribs 320 is aligned with the second side 332 such that each of the flow directing ribs 320 extends along axis $A_F$ defined through the respective flow directing rib 320. Stated another way, each of the flow directing ribs 320 extends from the top cavity wall 312 along the axis $A_F$, which is substantially perpendicular to an axis $A_T$ of the top cavity wall 312.

It should be noted, however, in other embodiments, the flow directing ribs 320 may be orientated differently relative to the top cavity wall 312. In one example, with reference to FIG. 2D, the first side 330 of each of the flow directing ribs 320 is at an angle relative to the second side 332 such that each of the flow directing ribs 320 extends along an axis $A_{F1}$ defined through the respective flow directing rib 320. Stated another way, each of the flow directing ribs 320 extend from the top cavity wall 312 along the axis $A_{F1}$, which is substantially transverse or oblique to the axis $A_T$ of the top cavity wall 312. Thus, in certain embodiments, the flow directing ribs 320 extend at an angle γ relative to the top cavity wall 312 to further assist in directing the cooling fluid F into the tip dust holes 324. In one example, the angle γ is about 20 degrees to about 50 degrees. Thus, in this example, each of the flow directing ribs 320 extends at the angle γ and the angle β relative to the top cavity wall 312.

It should be noted, however, in other embodiments, the flow directing ribs 320 may be orientated differently relative to the top cavity wall 312. In one example, with reference to FIG. 2E, the first side 330 of each of the flow directing ribs 320 is curved relative to the second side 332 such that each of the flow directing ribs 320 extends along an arc of an ellipse E that has a center CP above the top cavity wall 312. Stated another way, in this example, each of the flow directing ribs 320 is curved relative to the top cavity wall 312.

However, in other embodiments, the flow directing ribs 320 may be orientated differently relative to the top cavity wall 312. In one example, with reference to FIG. 2F, two of the flow directing ribs 320 (labeled 320a, 320b for clarity) proximate the leading edge 204 extend substantially perpendicular to the axis $A_T$ of the top cavity wall 312, the flow directing rib 320 (labeled 320c for clarity) proximate the trailing edge 224 is curved relative to the top cavity wall 312 and two of the flow directing ribs 320 (labeled 320d, 320e for clarity) between the leading edge 204 and the trailing edge 224 are angled relative to the top cavity wall 312. It should be noted, however, that any combination and arrangement of angled, curved, straight or perpendicular orientated flow directing ribs 320 may be employed within the tip flow passage 248. In addition, it should be noted that in this example, the length L1 of the flow directing ribs 320 increases from the flow directing rib 320 (labeled 320a for clarity) proximate the leading edge 204 to the flow directing rib 320 (labeled 320c for clarity) proximate the trailing edge 224.

However, in other embodiments, the flow directing ribs 320 may be orientated differently relative to the inner surface 218.1 of the pressure sidewall 218 and the inner surface 220.1 of the suction sidewall 220. In one example, each of the flow directing ribs 320 may be configured with a compound curvature that extends between the first end 326 proximate to the inner surface 220.1 of the suction sidewall 220 and the second end 328 proximate the inner surface 218.1 of the pressure sidewall 218.

With reference back to FIG. 8, each of the flow scoops 322 is defined along both the top cavity wall 312 and the inner surface 218.1 of the pressure sidewall 218. In one example, the flow scoops 322 include a first scoop end 340 opposite a second scoop end 342, and a first scoop side 344 (FIG. 2C) opposite a second scoop side 346 (FIG. 2C). With reference to FIG. 8, the first scoop end 340 extends into the tip flow passage 248. The second scoop end 342 is coupled to the inner surface 218.1 of the pressure sidewall 218, and is integrally formed with the second end 328 of the respective flow directing rib 320. The second scoop end 342 extends along the inner surface 218.1 from the respective flow directing rib 320 at the top cavity wall 312 to a position proximate a downstream perimeter 350a of the inlet 350. With reference to FIG. 2C, the first scoop side 344 is positioned within the tip flow passage 248 and surrounds the downstream perimeter 350a of the respective inlet 350 to direct cooling fluid F, including the entrained particles, into the respective tip dust hole 324. The second scoop side 346 is coupled to the top cavity wall 312 proximate the respective flow directing rib 320 and is coupled to the inner surface 218.1 of the pressure sidewall 218. Generally, each of the flow scoops 322 has a continuous concave curvature from the second scoop side 346 to the first scoop side 344 on a side of the flow scoop 322 that is opposite the respective flow directing rib 320. With reference back to FIG. 8, each of the flow scoops 322 extend outwardly into the tip flow passage 248 a distance FD. By protruding into the tip flow passage 248, each of the flow scoops 322 directs the cooling fluid F, including the entrained particles, into the respective tip dust hole 324. Thus, generally, each of the flow scoops 322 extend outwardly from a portion of the inner surface 218.1 of the pressure sidewall 218 and cooperate with the respective flow directing rib 320 to direct the fine sand and dust particles into the respective tip dust hole 324. Generally, the respective flow scoop 322 and the respective flow directing rib 320 form an integral, monolithic or one-piece structure for directing the fine sand and dust particles into the respective tip dust hole 324. It should be noted that the shape of the flow scoop 322 is merely exemplary, and the flow scoop 322 may have a different curvature or shape to direct the cooling fluid F into the respective tip dust hole 324. Further, in certain instances, the flow scoop 322 may be recessed slightly about a respective inlet 350, if desired, to facilitate drawing dust particles into the dust hole 324.

With reference to FIG. 2G, the respective flow directing rib 320 and the respective flow scoop 322 guide the cooling fluid F with the entrained particles into an inlet 350 of respective tip dust hole 324. As shown in FIG. 2G, the respective flow scoop 322 surrounds a portion of a perimeter or circumference of the inlet 350. Generally, the respective flow scoop 322 surrounds at least the downstream perimeter 350a of the inlet 350 to direct the cooling fluid F, including the entrained particles, into the associated tip dust hole 324. In one example, the first scoop end 340 is proximate the inlet 350, and the second scoop end 342 terminates at the inner surface 218.1 of the pressure sidewall 218 proximate the inlet 350 such that the flow scoop 322, between the first scoop end 340 and the second scoop end 342, surrounds the downstream perimeter 350a of the inlet 350 to direct the cooling fluid F into the inlet 350. Thus, in this example, with reference back to FIG. 2C, the second scoop side 346 is coupled to the top cavity wall 312 and the inner sidewall 218.1 such that the flow scoop 322 extends outwardly from the inner sidewall 218.1 about the downstream perimeter 350a of the inlet 350. It should be noted that the size and shape of the flow scoops 322 shown herein is merely exemplary, as the flow scoops 322 may have any desired shape such as larger or smaller than that shown.

Figure 8A:
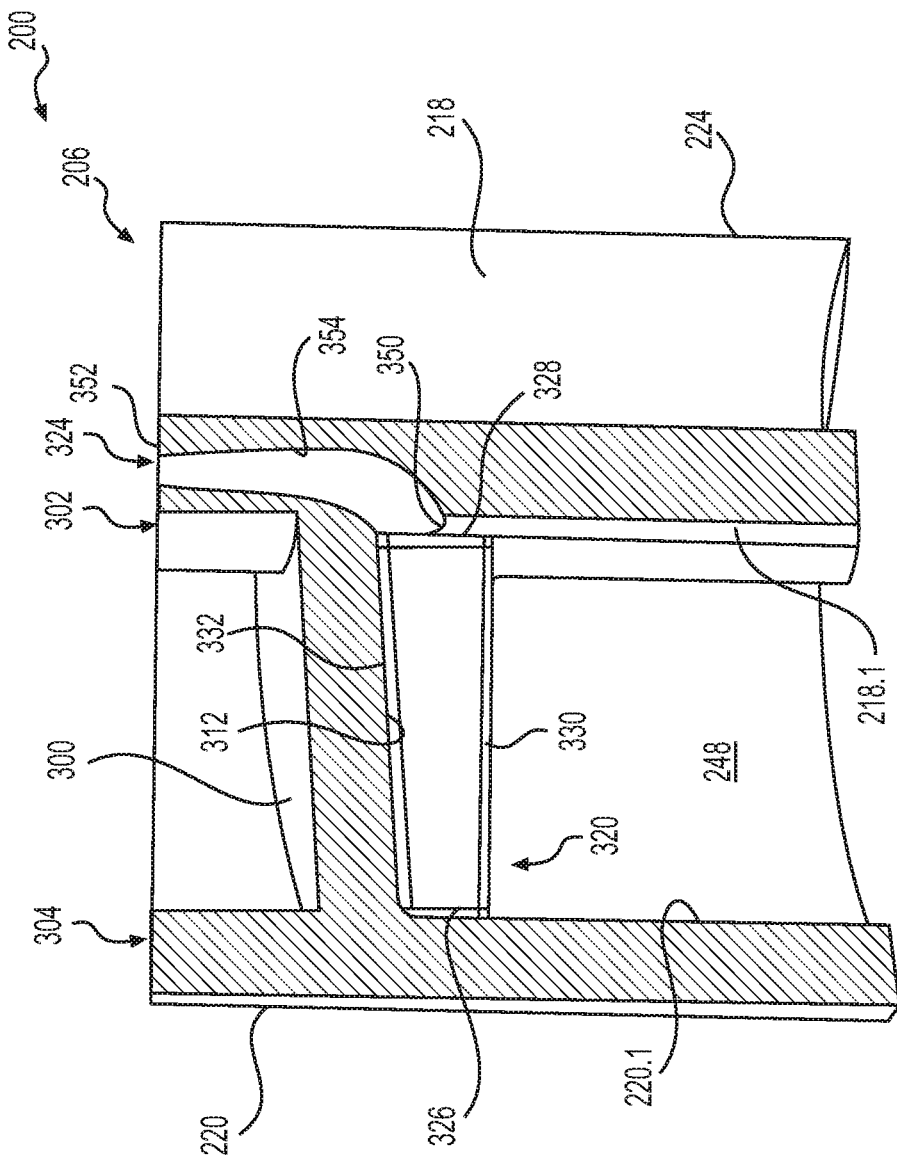
FIG. 8A is a cross-sectional view taken from the perspective of line 8-8 of FIG. 2C, which illustrates a tip flow passage of the first conduit in accordance with another exemplary embodiment.
Figure 10:
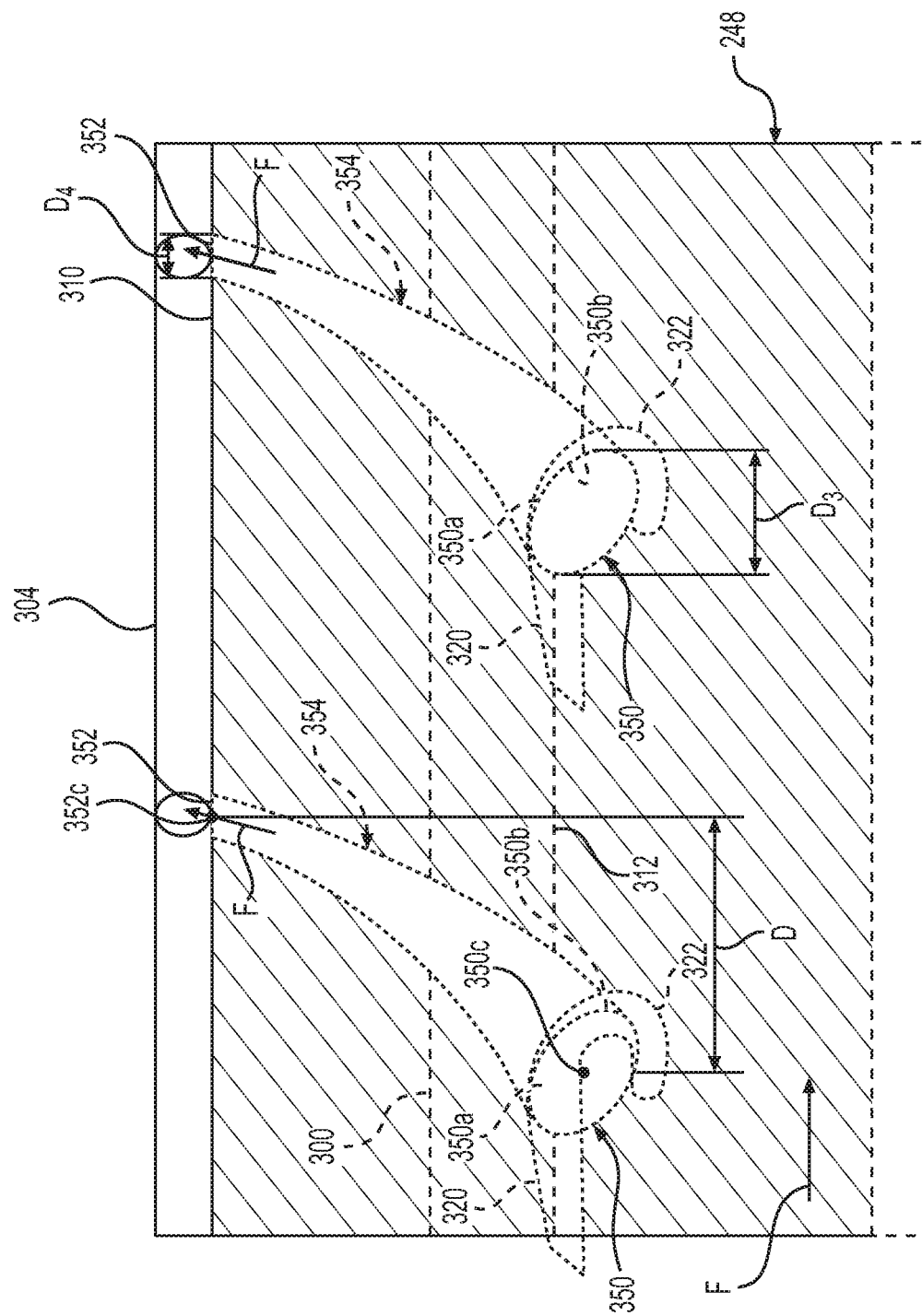
FIG. 10 is a cross-sectional view taken along line 10-10 of FIG. 2C, which illustrates a plurality of tip dust holes of the tip flow passage of FIG. 8.

With reference to FIG. 8A, each of the tip dust holes 324 define a flow passage 354 that extends from the inlet 350 to an outlet 352. Each of the tip dust holes 324 is defined through the pressure side squealer tip extension 302 such that the flow passage 354 is defined between the first wall 306 and the second wall 308. The inlet 350 is defined through the top cavity wall 312 and a portion of the inner surface 218.1 of the pressure sidewall 218. Thus, each of the tip dust holes 324 are defined through the pressure sidewall 218 from the top cavity wall 312 to the tip 226. The inlet 350 is substantially circular, and is at least partially surrounded by the respective flow scoop 322 as discussed. It should be noted that the inlet 350 may have any desired shape, such as elliptical, hexagonal, etc. The outlet 352 is defined through the tip wall 310, and is in fluid communication with a fluid surrounding the tip 226 of the airfoil 206. Thus, each of the inlets 350 are in fluid communication with the tip flow passage 248 and each of the outlets 352 are in fluid communication with a fluid surrounding the tip 226 of the airfoil 206 to direct fine sand and dust particles in the cooling fluid F out of the airfoil 206. With reference to FIG. 10, in one example, the flow passage 354 of each of the tip dust holes 324 is curved between the inlet 350 and the outlet 352 such that the inlet 350 and the outlet 352 do not lie in the same plane. Stated another way, the inlet 350 of each of the tip dust holes 324 is offset from the outlet 352 of the respective tip dust hole 324 such that each of the tip dust holes 324 extends along an arc within the pressure side squealer tip extension 302. In this example, each of the inlet 350 and the outlet 352 are substantially circular and include a respective center point 350c, 352c. In this example, a distance D between the center point 350c of the inlet 350 and the center point 352c of the outlet 352 is greater than zero, and in one example, is between about 1 and about 5 times a hydraulic diameter of the inlet 350. In one example, for each tip dust hole 324, the inlet 350 has a diameter D3 and the outlet 352 has a diameter D4. In this example, the diameter D3 is greater than the diameter D4, such that the tip dust hole 324 tapers from the inlet 350 to the outlet 352. By tapering from the inlet 350 to the outlet 352, each of the tip dust holes 324 enhance the momentum of the cooling fluid F exiting the respective tip dust hole 324, which enhances blade tip clearance sensitivity. The fine sand and dust particles and a portion of the cooling fluid F exit the outlet 352 into the fluid surrounding the turbine blade 200. The remainder of the cooling fluid F exits the tip flow passage 248 at the slot 325 (FIG. 4). It should be noted that the diameters D3, D4 may vary for each of the tip dust holes 324 within the airfoil 206.

In one example, a ratio of fine sand and dust particles exiting the tip dust holes 324 relative to the fine sand and dust particles passing through the tip flow passage 248 is greater than a ratio of cooling fluid F exiting through the tip dust holes 324 relative to the cooling fluid F moving through the tip flow passage 248. Generally, about 20 percent to about 50 percent of overall blade cooling fluid F flow exits the tip dust holes 324. The fine sand and dust particles and the cooling fluid F in the tip flow passage 248 moves in a nominally chord-wise direction. The tip dust hole 324 and the flow scoop 322 are oriented such that the axis of the tip dust hole 324 at the inlet 350 is also oriented somewhat in the chord-wise direction. This minimizes losses at the inlet 350 of the tip dust hole 324 (recovering dynamic head) and allows for a larger quantity of fine sand and dust particles to be captured by the respective flow scoop 322 and tip dust hole 324. Once the cooling fluid F is in the respective tip dust hole 324, the tip dust hole 324 turns radially, allowing for convective cooling of the hot squealer tip walls 306, 308. The tangential orientation of the tip dust hole 324 exit allows the exhausting cooling fluid F to act as a barrier against hot gas along the pressure side 218 spilling over the pressure side squealer tip extension 302, in addition to ejecting the extracted fine sand and dust particles away from the turbine blade 200 (FIG. 8). By passing the cooling fluid F through the pressure side squealer tip extension 302 and preventing the hot pressure side gas from spilling over the tip 226, temperatures at the tip 226 of the turbine blade 200 are reduced and the efficiency of the high pressure turbine 126 is increased.

It should be noted that in certain embodiments, with reference to FIG. 8A, the tip flow passage 248 may be configured differently. In the example of FIG. 8A, the tip flow passage 248 includes the plurality of flow directing ribs 320 and the plurality of tip dust holes 324. The flow directing ribs 320 are defined on the top cavity wall 312, and the tip dust holes 324 are defined through the pressure side squealer tip extension 302. Thus, in the example of FIG. 8A, the flow directing ribs 320 of the tip flow passage 248 direct the fine sand and dust particles to the tip dust holes 324 without the use of the flow scoops 322. Accordingly, in certain embodiments, the tip flow passage 248 may be configured differently to direct the fine sand and dust particles entrained in the cooling fluid F into the tip dust holes 324.

Figure 9:
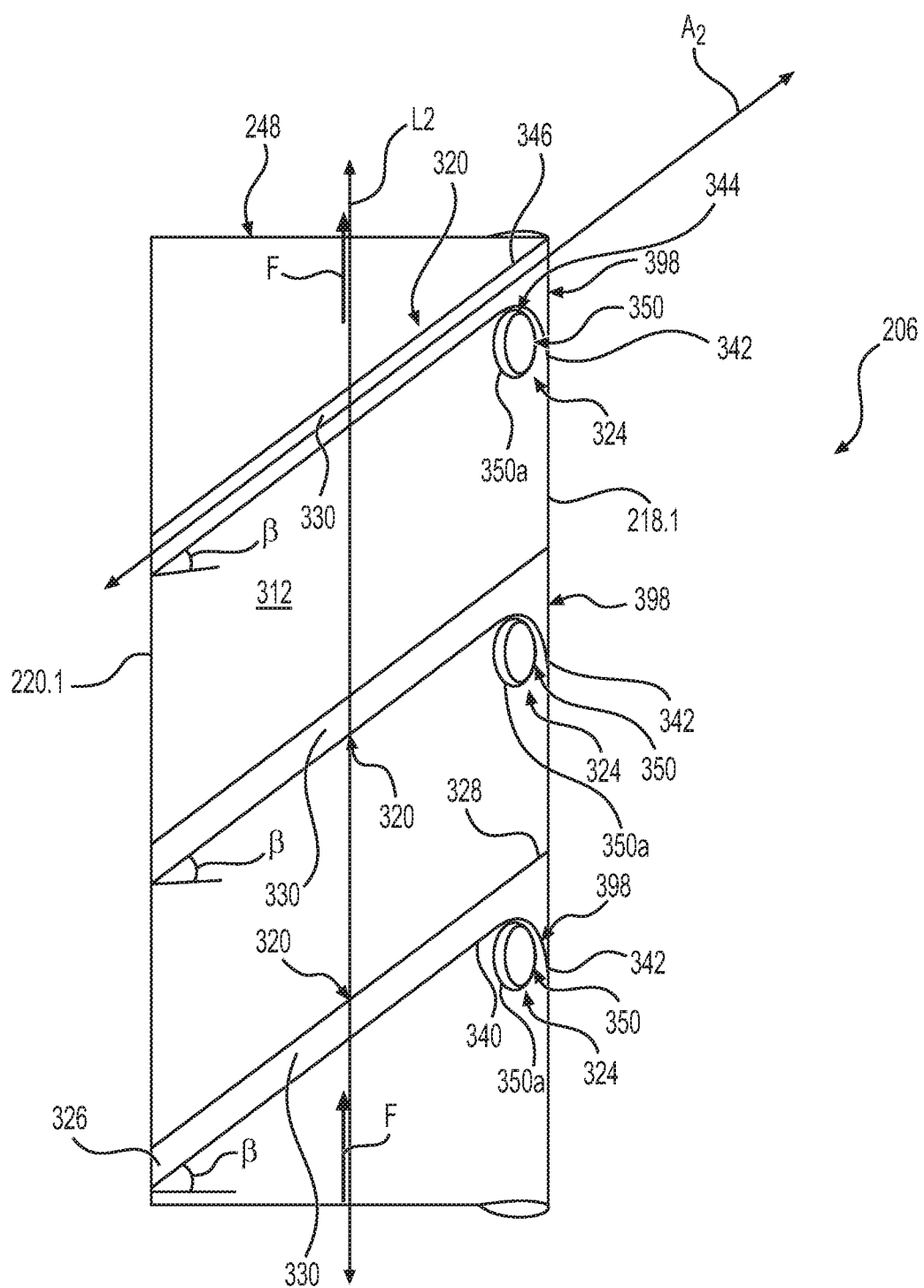
FIG. 9 is a rotated schematic cross-sectional illustration taken from the perspective of line 2G-2G of FIG. 2C, which illustrates a top cavity wall of the tip flow passage in accordance with another exemplary embodiment.

Further, it should be noted that in certain embodiments, with reference to FIG. 9, the tip flow passage 248 may be configured differently. In the example of FIG. 9, the tip flow passage 248 includes the plurality of flow directing ribs 320, a plurality of flow scoops 398 and the plurality of tip dust holes 324. The flow scoops 398 are defined on the top cavity wall 312 integrally with the respective flow directing rib 320, and curve from the top cavity wall 312 along the inner surface 218.1 of the pressure sidewall 218 to be proximate the downstream perimeter 350a of the respective inlet 350. Thus, in the example of FIG. 9, the flow scoops 398 are configured differently to direct the fine sand and dust particles to the tip dust holes 324. Accordingly, in certain embodiments, the tip flow passage 248 may be configured differently to direct the fine sand and dust particles entrained in the cooling fluid F into the tip dust holes 324.

With reference back to FIG. 4, in one example, the second conduit 242 includes a second platform flow passage 356 and a serpentine passage 358. The second platform flow passage 356 includes a first branch 360 and a second branch 362, which converge into a single inlet branch 364 before the platform 230. The first branch 360 is in fluid communication with the inlet 234c to receive the cooling fluid F from the source of the cooling fluid F, and the second branch 362 is in fluid communication with the inlet 234d to receive the cooling fluid F from the source of the cooling fluid F. The single inlet branch 364 receives the cooling fluid F from the first branch 360 and the second branch 362, and directs the cooling fluid F into the serpentine passage 358.

The serpentine passage 358 is defined between the inner wall 263, a surface 366 opposite the bottom cavity wall 314 and the trailing edge 224. In one example, the serpentine passage 358 includes a plurality of second cooling features 368. In one example, the second cooling features 368 include a plurality of ribs 370 and a pin bank 372 defined within the serpentine passage 358; however the serpentine passage 358 may include any particular type of cooling features. In this example, the cooling fluid F exits the serpentine passage 358 via a plurality of trailing edge slots 374.

In one example, each of the cooling features 264, 368 are integrally formed, monolithic or one-piece, and are composed of a metal or metal alloy. In this example, the dust tolerant cooling system 202, including each of the cooling features 264, 368, is integrally formed, monolithic or one-piece with the airfoil 206, and the cooling features 264, 368 are composed of the same metal or metal alloy as the airfoil 206. Generally, the airfoil 206 and the cooling features 264, 368 are composed of an oxidation and stress rupture resistant, single crystal, nickel-based superalloy, including, but not limited to, the nickel-based superalloy commercially identified as "CMSX4" or the nickel-based superalloy identified as "SC180." Alternatively, the airfoil 206 and the cooling features 264, 368 may be composed of directionally solidified nickel base alloys, including, but not limited to, Mar-M-247DS. As a further alternative, the airfoil 206 and the cooling features 264, 368 may be composed of polycrystalline alloys, including, but not limited to, Mar-M-247EA.

Figure 11:
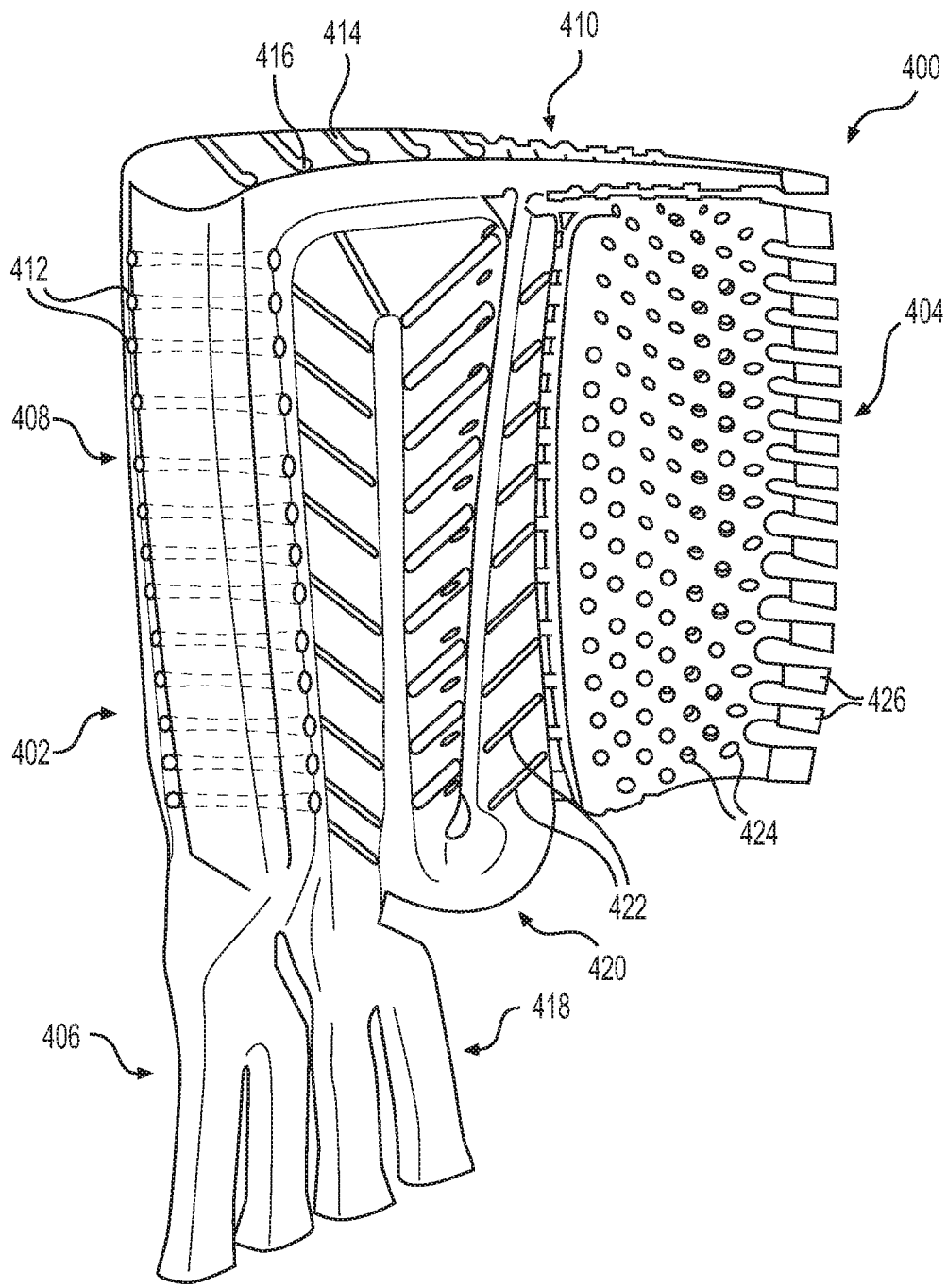
FIG. 11 is a perspective view of a core used to form the turbine blade of FIG. 3, which includes the dust tolerant cooling system.

In one example, in order to manufacture the turbine blade 200 including the dust tolerant cooling system 202 with the cooling features 264, 368, with reference to FIG. 11, a core 400 that defines the turbine blade 200 including the respective one of the cooling features 264, 368, is cast, molded or printed from a ceramic material. In one example, the core 400 is formed using ceramic stereolithography. As shown, the core 400 includes a first core 402 of the first conduit 240 and a second core 404 of the second conduit 242. The first core 402 of the first conduit 240 includes a first core portion 406 of the first platform flow passage 244, a second core portion 408 of the leading edge flow passage 246 and a third core portion 410 of the tip flow passage 248. The second core portion 408 of the leading edge flow passage 246 includes a plurality of bores 412, which are shaped to form the plurality of cooling features 264. The third core portion 410 of the tip flow passage 248 includes a plurality of indentations 414, which form the plurality of flow directing ribs 320. The third core portion 410 also includes a plurality of scoop indentations 416, which form the plurality of flow scoops 322. In this example, the first core 402 of the first conduit 240 does not include the plurality of tip dust holes 324, as these are formed via machining, for example, once the turbine blade 200 is cast. It should be understood, however, that in other embodiments, the first core 402 includes a plurality of projections, which form the plurality of tip dust holes 324.

The second core 404 of the second conduit 242 includes a first core portion 418 of the second platform flow passage 356 and a second core portion 420 of the serpentine passage 358. The second core portion 420 of the serpentine passage 358 includes a plurality of second indentations 422, which form the plurality of ribs 370. The second core portion 420 also includes a plurality of bores 424, which form the pin bank 372. In this example, the second core portion 420 also includes a plurality of spaced apart projections 426, which form the plurality of trailing edge slots 374.

In this example, the core 400 is manufactured from a ceramic using ceramic additive manufacturing. With the core formed, the core is positioned within a die. With the core positioned within the die, the die is injected with liquid wax such that liquid wax surrounds the core. A wax sprue or conduit may also be coupled to the cavity within the die to aid in the formation of the turbine blade 200. Once the wax has hardened to form a wax pattern, the wax pattern is coated or dipped in ceramic to create a ceramic mold about the wax pattern. After coating the wax pattern with ceramic, the wax pattern may be subject to stuccoing and hardening. The coating, stuccoing and hardening processes may be repeated until the ceramic mold has reached the desired thickness.

With the ceramic mold at the desired thickness, the wax is heated to melt the wax out of the ceramic mold. With the wax melted out of the ceramic mold, voids remain surrounding the core 400, and the ceramic mold is filled with molten metal or metal alloy. In one example, the molten metal is poured down an opening created by the wax sprue. It should be noted, however, that vacuum drawing may be used to fill the ceramic mold with the molten metal. Once the metal or metal alloy has solidified, the ceramic is removed from the metal or metal alloy, through chemical leaching, for example, leaving the dust tolerant cooling system 202, including the cooling features 264, 368, the first conduit 240 and the second conduit 242, formed in the turbine blade 200, as illustrated in FIG. 3. Generally, the turbine blade 200 is formed with the platform 230 and the root 232 integrally formed with the turbine blade 200. It should be noted that alternatively, the respective one of the cooling features 264, 368 may be formed in the turbine blade 200 using conventional dies with one or more portions of the core 400 (or portions adjacent to the core 400) comprising a fugitive core insert. As a further alternative, the turbine blade 200 including the dust tolerant cooling system 202 may be formed using other additive manufacturing processes, including, but not limited to, direct metal laser sintering, electron beam melting, binder jet printing, etc.

With reference to FIG. 8, with the turbine blade 200 formed, the plurality of tip dust holes 324 are formed by machining each of the plurality of tip dust holes 324 into the tip 226 of the turbine blade 200. In one example, each of the plurality of tip dust holes 324 are drilled through the tip wall 310 such that the outlet 352 is offset from the inlet 350 or the outlet 352 lies in a different plane than the inlet 350 (FIGS. 8 and 9). It should be noted, that alternatively, the core 400 (FIG. 11) may include a part of or an entirety of each of the tip dust holes 324, such that the tip dust holes 324 are formed during the casting of the turbine blade 200. In this example, the third core portion 410 (FIG. 11) would include a plurality of curved projections, which extend outwardly from the third core portion 410.

The above process may be repeated to form a plurality of the turbine blades 200. With the plurality of turbine blades 200 formed, the turbine blades 200 may be coupled to the hub 233 (FIG. 2), via the root 232, to form a turbine rotor 235 of the high pressure turbine 126 (FIG. 2). With the turbine rotor 235 formed, the turbine rotor 235 is installed into the gas turbine engine 100 (FIG. 1). In use, as the gas turbine engine 100 operates, the cooling fluid F is supplied to the first conduit 240 and the second conduit 242 through the respective inlet 234a-234d. In the example of the first conduit 240, the cooling fluid F flows through the first platform flow passage 244 and into the leading edge flow passage 246. As the cooling fluid F flows through the leading edge flow passage 246, the cooling features 264 cooperate to transfer heat from the leading edge 204 into the cooling fluid F while reducing an accumulation of fine sand and dust particles within the leading edge flow passage 246. The cooling fluid F flows from the leading edge flow passage 246 into the tip flow passage 248. The flow directing ribs 320 cooperate with the flow scoops 322 to guide the fine sand and dust particles entrained within the cooling fluid F into the respective tip dust hole 324. By directing the fine sand and dust particles out of the turbine blade 200 via the tip dust hole 324, a longevity of the turbine blade 200 is improved through the reduction in the accumulation of fine sand and dust particles within the turbine blade 200. The cooling fluid F exits the tip flow passage 248 at the slot 325 defined at the trailing edge 224 (FIG. 4).

In the example of the second conduit 242, the cooling fluid F flows through the second platform flow passage 356 and into the serpentine passage 358. The cooling fluid F flows through the ribs 370, the pin bank 372 and exits the serpentine passage 358 through the trailing edge slots 374 defined at the trailing edge 224.

It will be understood that the turbine blade 200 described with regard to FIGS. 1-11 may be configured differently to provide dust tolerant cooling to a leading edge flow passage. In one example, with reference to FIG. 12, a turbine blade 500 is shown. As the turbine blade 500 includes components that are substantially similar to or the same as the turbine blade 200 discussed with regard to FIGS. 1-11, the same reference numerals will be used to denote the same or similar features.

Figure 12:
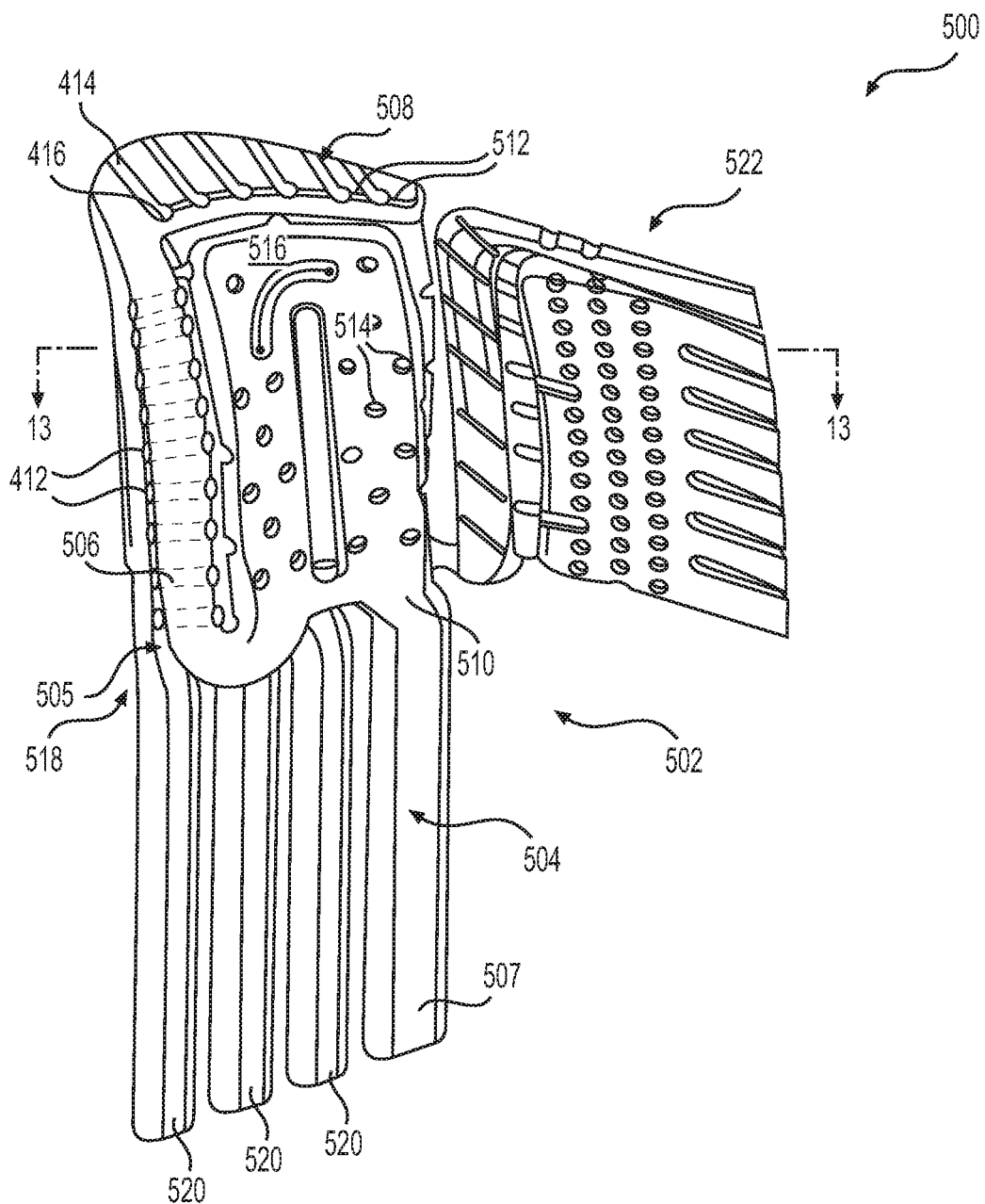
FIG. 12 is a perspective view of another core used to form another exemplary turbine blade, which includes a dust tolerant cooling system in accordance with various embodiments.

In FIG. 12, a core 502 of the turbine blade 500 is shown. The core 502 is used to form the turbine blade 500, via investment casting, as discussed with regard to the turbine blade 200 of FIGS. 1-11. In the example of FIG. 12, the core 502 of the turbine blade 500 includes a first core portion 504 that forms a leading edge flow passage 506, a tip flow passage 508 and a serpentine passage 510. In this example, the turbine blade 500 is a bottom-fed turbine blade, and the first core portion 504 also forms an inlet portion 507. The leading edge flow passage 506 of the first core portion 504 includes the plurality of bores 412, which are shaped to form the plurality of cooling features 264. The tip flow passage 508 of the first core portion 504 includes the plurality of indentations 414, which form the plurality of flow directing ribs 320. The tip flow passage 508 of the first core portion 504 also includes the plurality of scoop indentations 416, which form the plurality of flow scoops 322. In this example, the tip flow passage 508 of the first core portion 504 includes a plurality of projections 512 that form the plurality of tip dust holes 324. The serpentine passage 510 of the first core portion 504 includes a plurality of bores 514 that form a plurality of second cooling pins within the serpentine passage 510. The serpentine passage 510 of the first core portion 504 may also include an indentation 516 that forms a flow splitter.

The core 502 includes at least one second core portion 505, which forms a plurality of second cooling passages 518, which extend along the suction sidewall 220 of the turbine blade 500. The second core portion 505 includes a plurality of inlet portions 520, one for each one of the plurality of second cooling passages 518. One of the second cooling passages 518 may also include a trailing edge flow circuit 522.

Figure 13:
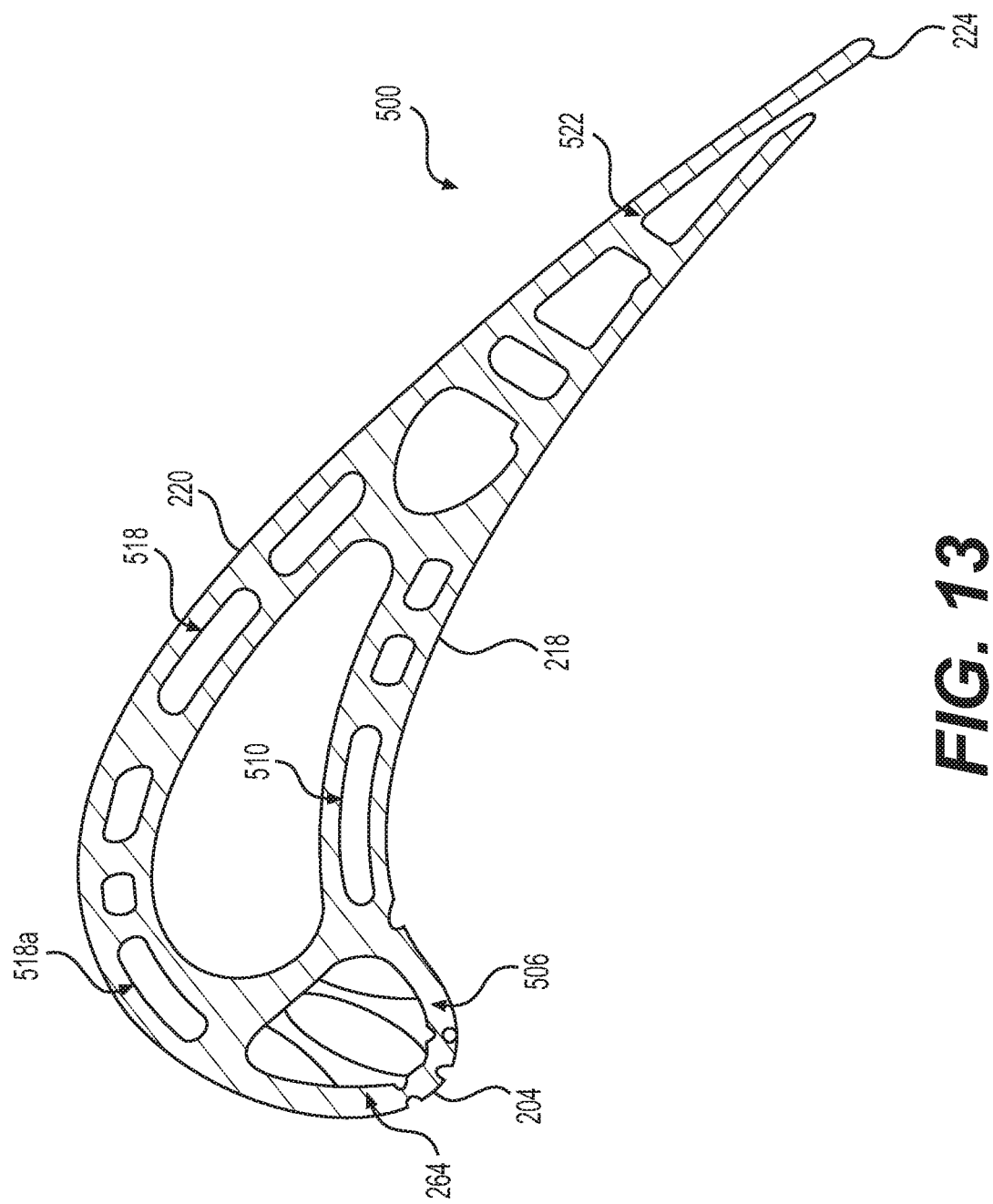
FIG. 13 is a cross-sectional view taken along line 13-13 of FIG. 12 of the turbine blade formed by the core of FIG. 12.

With reference to FIG. 13, a cross-section of the turbine blade 500 formed by the core 502 of FIG. 12 is shown. In this example, the leading edge flow passage 506 includes the plurality of cooling features 264, which promote conductive heat transfer with the cooling fluid F received through an inlet defined by the inlet portion 507 of the core 502 while reducing an accumulation of fine sand and dust particles within the leading edge flow passage 506.

Figure 14:
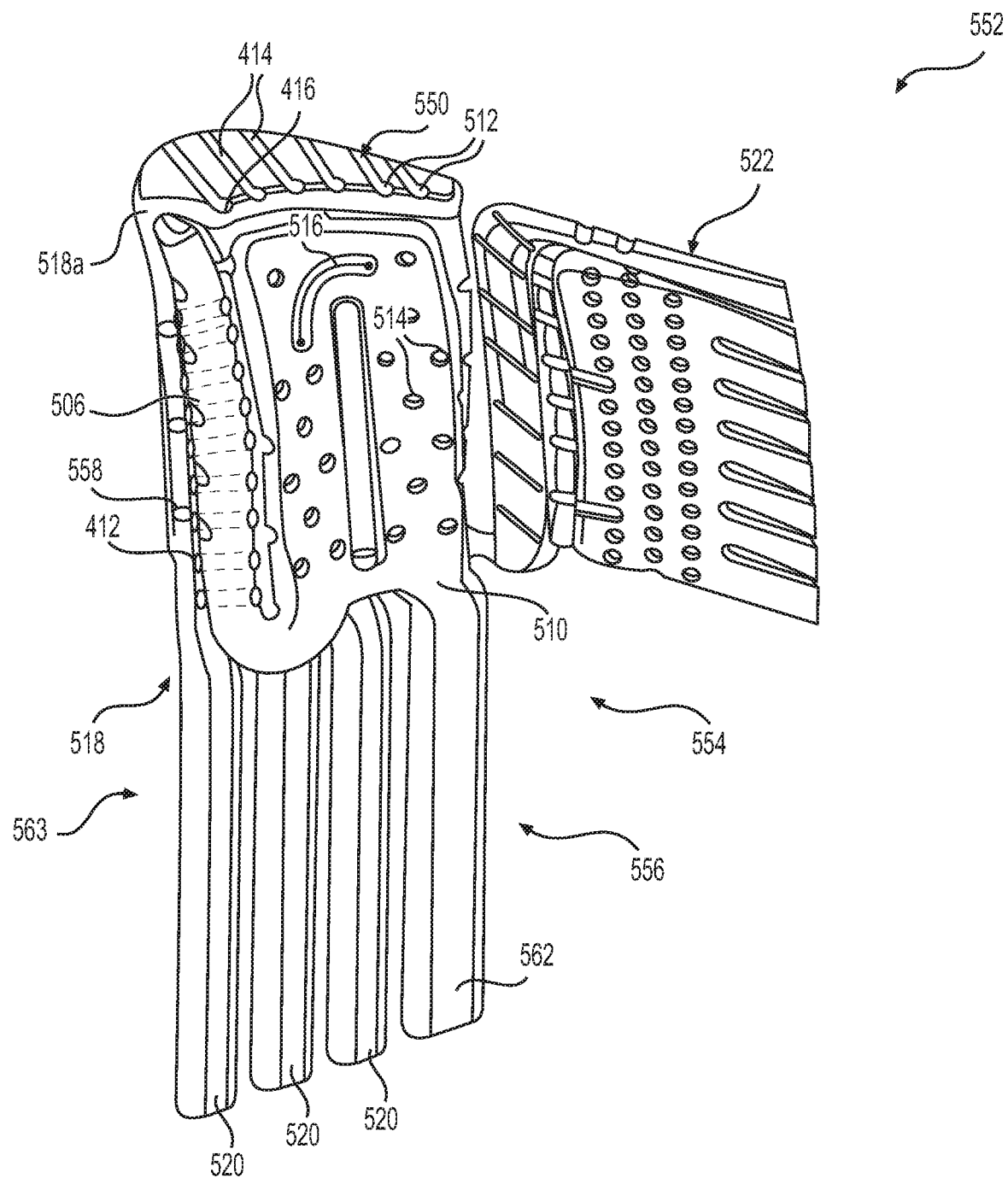
FIG. 14 is a perspective view of another core used to form another exemplary turbine blade, which includes a dust tolerant cooling system in accordance with various embodiments.

It should be noted that while the turbine blade 500 of FIG. 12 includes the tip flow passage 508 that receives the cooling fluid F from the leading edge flow passage 506, in other embodiments, a tip flow passage 550 of a turbine blade 552 may receive cooling fluid F from one of the plurality of second cooling passages 518. In this regard, with additional reference to FIG. 14, a core 554 of the turbine blade 552 is shown. The core 554 is used to form the turbine blade 552, via investment casting, as discussed with regard to the turbine blade 200 of FIGS. 1-11. In the example of FIG. 14, the core 554 of the turbine blade 552 includes a first core portion 556 that forms a leading edge cooling passage 558 and the serpentine passage 510. In this example, the turbine blade 552 is a bottom-fed turbine blade, and the first core portion 556 also forms an inlet portion 562. The leading edge cooling passage 558 of the first core portion 556 includes the plurality of bores 412, which are shaped to form the plurality of cooling features 264.

The core 554 includes at least one second core portion 563, which forms the plurality of second cooling passages 518, which extend along the suction sidewall 220 of the turbine blade 500. In this example, one of the second cooling passages 518a of the second core portion 563 forms the tip flow passage 550. Thus, in the example of FIG. 13, the tip flow passage 550 is in fluid communication with a cooling passage defined along the suction sidewall 220 to receive the cooling fluid F (FIG. 13). The tip flow passage 550 of the second core portion 563 includes the plurality of indentations 414, which form the plurality of flow directing ribs 320. The tip flow passage 550 of the second core portion 563 also includes the plurality of scoop indentations 416, which form the plurality of flow scoops 322. In this example, the tip flow passage 550 of the second core portion 563 includes the plurality of projections 512 that form the plurality of tip dust holes 324. The second core portion 563 includes the plurality of inlet portions 520, one for each one of the plurality of second cooling passages 518. Another one of the second cooling passages 518 may also include a trailing edge flow circuit 522. Thus, as shown in FIGS. 12-14, a tip flow passage, including the flow directing ribs 320, the flow scoops 322 and the tip dust holes 324 may receive cooling fluid F from either the leading edge flow passage 506 or the second cooling passage 518a, and direct entrained particles in the cooling fluid F out of the turbine blade 500, 552 to improve a longevity and performance of the turbine blade 500, 552. Further, each of the turbine blades 500, 552 include the plurality of cooling features 264, which improve cooling of the leading edge 204, while reducing an accumulation of fine sand and dust particles.

It will be understood that the turbine blade 200 described with regard to FIGS. 1-11 may be configured differently to provide dust tolerant cooling to a leading edge flow passage. In one example, with reference to FIG. 15, a turbine blade 600 is shown. As the turbine blade 600 includes components that are substantially similar to or the same as the turbine blade 200 discussed with regard to FIGS. 1-11, the same reference numerals will be used to denote the same or similar features.

Figure 15:
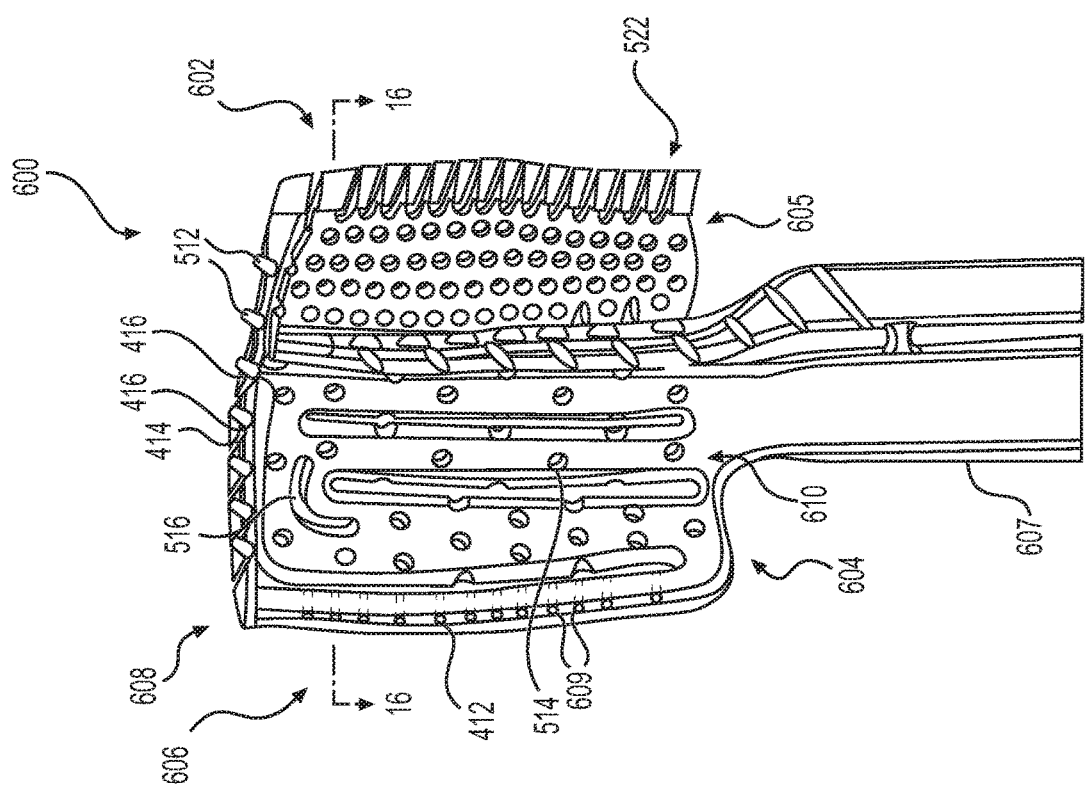
FIG. 15 is a perspective view of another core used to form another exemplary turbine blade, which includes a dust tolerant cooling system in accordance with various embodiments.

In FIG. 15, a core 602 of the turbine blade 600 is shown. The core 602 is used to form the turbine blade 600, via investment casting, as discussed with regard to the turbine blade 200 of FIGS. 1-11. In the example of FIG. 15, the core 602 of the turbine blade 600 includes a first core portion 604 that forms a leading edge flow passage 606, a tip flow passage 608 and a serpentine passage 610. In this example, the turbine blade 600 is a bottom-fed turbine blade with a central feed of the cooling fluid F, and the first core portion 604 also forms an inlet portion 607. The leading edge flow passage 606 of the first core portion 604 includes a plurality of bores 609, which are shaped to form a plurality of impingement holes 612. The tip flow passage 608 of the first core portion 604 includes the plurality of indentations 414, which form the plurality of flow directing ribs 320. The tip flow passage 608 of the first core portion 504 also includes the plurality of scoop indentations 416, which form the plurality of flow scoops 322. In this example, the tip flow passage 608 of the first core portion 604 includes the plurality of projections 512 that form the plurality of tip dust holes 324. The serpentine passage 610 of the first core portion 604 includes the plurality of bores 514 that form a plurality of second cooling pins within the serpentine passage 610. The serpentine passage 610 of the first core portion 604 may also include the indentation 516 that forms a flow splitter. The core 602 also includes at least one second core portion 605, which forms the trailing edge flow circuit 522.

Figure 16:
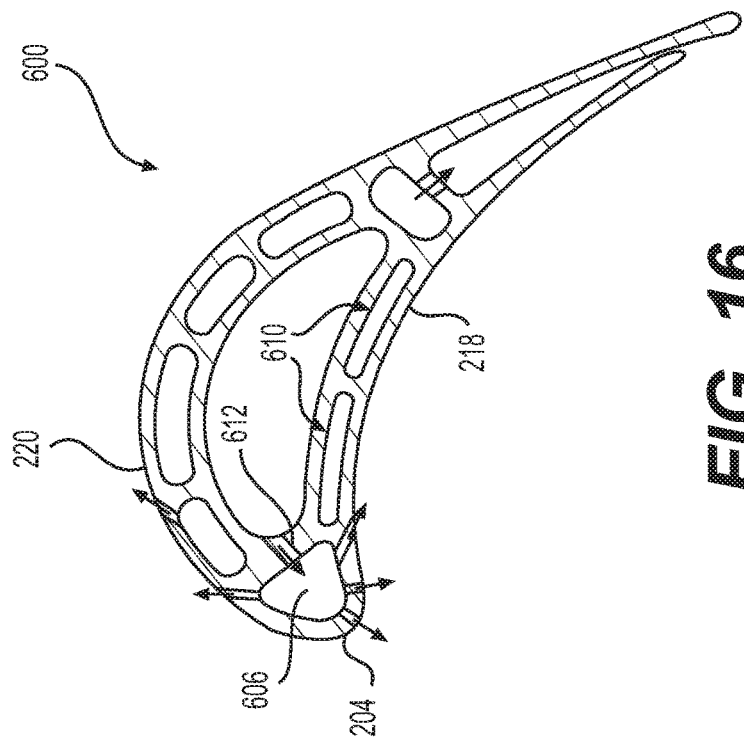
FIG. 16 is a cross-sectional view taken along line 16-16 of FIG. 15 of the turbine blade formed by the core of FIG. 15.

With reference to FIG. 16, a cross-section of the turbine blade 600 formed by the core 602 of FIG. 15 is shown. In this example, the leading edge flow passage 606 is cooled via impingement through one or more impingement holes 612. In this embodiment, the tip flow passage 608 of the turbine blade 600 is in fluid communication with the leading edge flow passage 606 to receive the cooling fluid F, and the leading edge flow passage 606 receives the cooling fluid F from an inlet defined by the inlet portion 607 through the impingement holes 612. Thus, as shown in FIGS. 15 and 16, a tip flow passage, including the flow directing ribs 320, the flow scoops 322 and the tip dust holes 324 may receive cooling fluid F from the leading edge flow passage 606, which is cooled via impingement, and direct entrained particles in the cooling fluid F out of the turbine blade 600 to improve a longevity and performance of the turbine blade 600.

Thus, the dust tolerant cooling system 202 connects the leading edge 204 of the airfoil 206 to the second surface 262, which is cooler than the leading edge 204 and enables a transfer of heat through the cooling features 264 and the cooling fluid F to cool the leading edge 204. Further, the cooling features 264 increase turbulence within the first conduit 240 by creating strong secondary flow structures due to the cooling features 264 traversing the first conduit 240 and extending between the first surface 260 and the second surface 262. Moreover, the cross-sectional shape of the cooling features 264 reduces an accumulation of fine sand and dust particles within the first conduit 240 as the reduced diameter of the first pin end 270 and the first fillet 274 minimizes an accumulation of fine sand and dust particles on the respective bottom surface 278. Further, the tip flow passage 248, 508, 550, 608 of the respective turbine blade 200, 500, 552, 600 includes the flow directing ribs 320 that cooperate with the respective flow scoops 322 and tip dust holes 324 to direct sand and fine particles out of the turbine blade 200, 500, 552, 600 at the tip 226, which reduces an accumulation of fine sand and dust particles and thereby improves a cooling of the turbine blade 200, 500, 552, 600 and a longevity of the turbine blade 200, 500, 552, 600.

Figure 17:
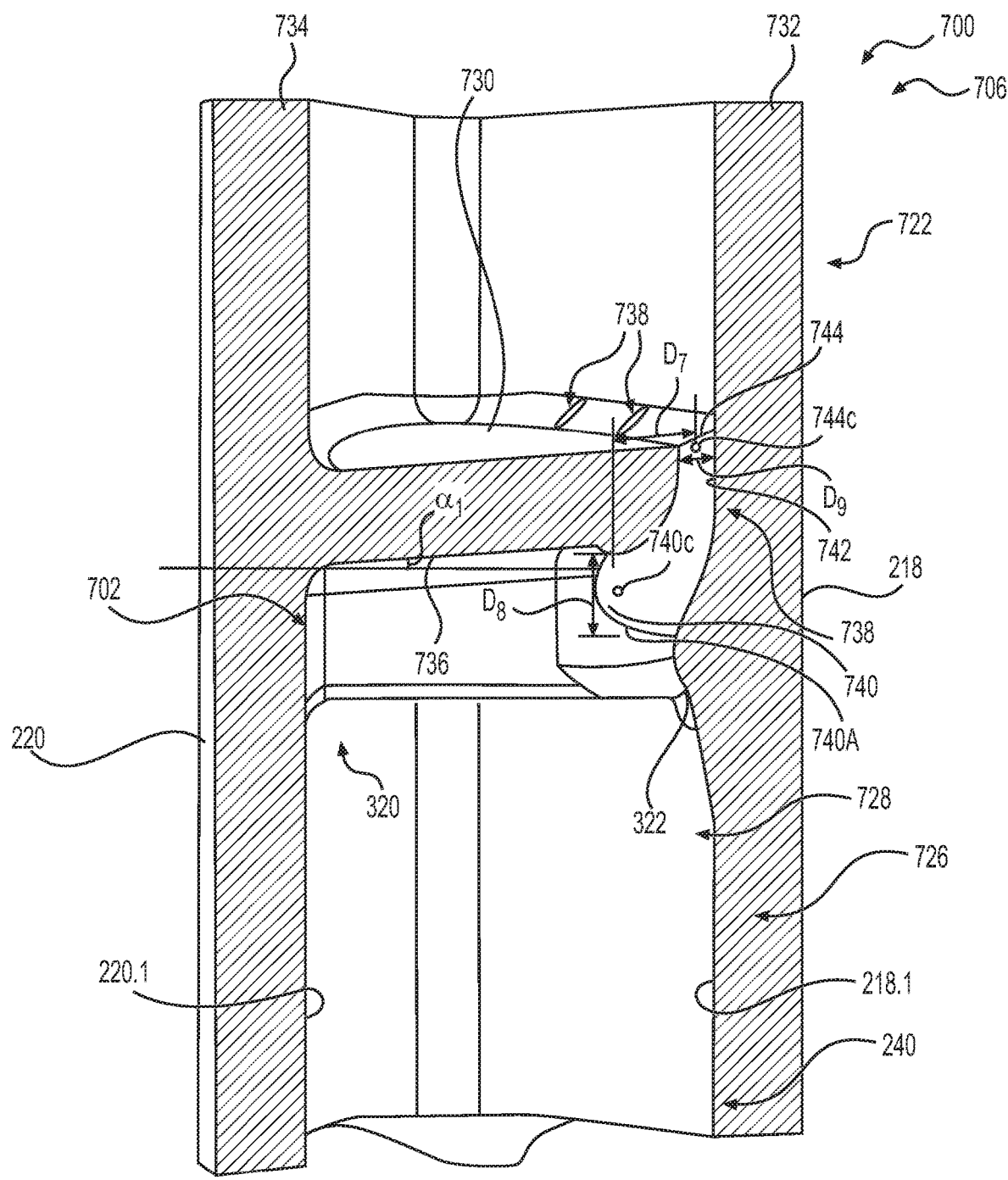
FIG. 17 is a cross-sectional view of another exemplary turbine blade, taken along the perspective of line 8-8 of FIG. 2C, which illustrates a dust tolerant cooling system having a tip dust hole with an outlet at a tip cap of the turbine blade.

It will be understood that the turbine blade 200 described with regard to FIGS. 1-11 may be configured differently to provide dust tolerant cooling to a leading edge flow passage. In one example, with reference to FIG. 17, a cross-section of a turbine blade 700 is shown taken from the perspective of line 8-8 of FIG. 2C. As the turbine blade 700 includes components that are substantially similar to or the same as the turbine blade 200 discussed with regard to FIGS. 1-11, the same reference numerals will be used to denote the same or similar features. In the example of FIG. 17, the turbine blade 700 includes an airfoil 706. The airfoil 706 has the pressure sidewall 218 and the suction sidewall 220. The pressure and suction sidewalls 218, 220 interconnect a leading edge and a trailing edge of the airfoil 706. In one example, as will be discussed in further detail below, a dust tolerant cooling system 702 is defined between the pressure and suction sidewalls 218, 220 along the leading edge of the airfoil 706, and extends along the tip of the airfoil 706. In this example, the dust tolerant cooling system 702 includes the first conduit 240 and the second, trailing edge conduit or second conduit 242 (not shown). The first conduit 240 includes the first platform flow passage 244 (not shown), the leading edge cooling circuit or leading edge flow passage 246 (not shown) and a tip region 726 that includes a tip flag channel or tip flow passage 728.

The tip region 726 including the tip flow passage 728 is in communication with the leading edge flow passage 246 to receive the cooling fluid F (not shown). The tip region 247 including the tip flow passage 728 extends from the leading edge to the trailing edge along the tip 722 of the airfoil 706. In this example, the tip region 726 of the airfoil 706 includes a tip cap (or tip wall) 730 and squealer tip extensions (or parapet walls) 732, 734. The tip cap 730 extends between the squealer tip extensions 732, 734 from the leading edge to the trailing edge of the airfoil 706. Generally, the tip cap 730 is recessed relative to the squealer tip extensions 732, 734, such that the squealer tip extensions 732, 734 extend for a distance above the tip cap 730. In this example, the squealer tip extensions 732, 734 are defined by portions of the pressure sidewall 218 and the suction sidewall 220 that extend radially beyond the tip cap 730.

In one example, a portion of the tip flow passage 728 is defined by a top cavity wall 736, the inner surface 218.1 of the pressure sidewall 218, the inner surface 220.1 of the suction sidewall 220 and a bottom cavity wall (not shown). The top cavity wall 736 extends from the leading edge to the trailing edge, and is opposite the tip cap 730 of the airfoil 706. The top cavity wall 736 bounds the tip flow passage 728, and extends from the pressure sidewall 218 to the suction sidewall 220 at an angle $\alpha_1$, which assists in guiding the cooling fluid F into one of a plurality of tip dust holes 738. The angle $\alpha_1$ is defined between the top cavity wall 736 and a line extending from the inner surface 220.1 of the suction sidewall 220 to the inner surface 218.1 of the pressure sidewall 218. In one example, angle $\alpha_1$ is a positive angle, and is between about 2 degrees to about 20 degrees. The angled top cavity wall 736 enables a centrifugal load acting on the fine sand and dust particles to drive the fine sand and dust particles entrained in the cooling fluid F into a respective tip dust hole 738. The inner surface 218.1 of the pressure sidewall 218 and the inner surface 220.1 of the suction sidewall 220 interconnect the top cavity wall 736 and the bottom cavity wall.

In this example, the tip flow passage 248 includes the plurality of flow directing ribs 320, a plurality of flow scoops 322 and the plurality of tip dust holes 738. In this example, the tip dust holes 738 are defined through the top cavity wall 736 and the tip cap 730. The flow directing ribs 320 cooperate with the flow scoops 322 to direct air, including entrained fine sand and dust particles, into the tip dust holes 738, and thus, out of the airfoil 706. In one example, for each tip dust hole 738, there is a respective flow directing rib 320 and flow scoop 322 associated with the particular tip dust hole 738. Depending upon the size of the airfoil 706, the airfoil 706 may include about 3 to about 10 flow directing ribs 320, flow scoops 322 and tip dust holes 738 that are spaced apart along the pressure sidewall 218 from the leading edge to the trailing edge. Other embodiments may include fewer than 3 or more than 10 flow directing ribs 320, flow scoops 322 and tip dust holes 738. By providing the flow directing ribs 320 and the flow scoops 322, fine sand and dust particles entrained in the cooling fluid F are directed out of the airfoil 706 through the tip dust holes 738, thereby reducing an accumulation of fine sand and dust particles within the airfoil 706. This increases a longevity of the airfoil 706, while ensuring proper cooling fluid F flow through the airfoil 706. A remainder of the cooling fluid F exits the tip flow passage 728 through a slot defined at the trailing edge (not shown).

The respective flow directing rib 320 and the respective flow scoop 322 guide the cooling fluid F with the entrained particles into an inlet 740 of respective tip dust hole 738. The respective flow scoop 322 surrounds a portion of a perimeter or circumference of the inlet 740. Generally, the respective flow scoop 322 surrounds at least a downstream perimeter 740a of the inlet 740 to direct the cooling fluid F, including the entrained particles, into the associated tip dust hole 738. Each of the tip dust holes 738 defines a flow passage 742 that extends from the inlet 740 to an outlet 744. Each of the tip dust holes 738 is defined through the tip cap 730 and the top wall cavity 736 such that the flow passage 742 is defined between the tip cap 730 and the top wall cavity 736. The inlet 740 is defined through the top cavity wall 736 and a portion of the inner surface 218.1 of the pressure sidewall 218. Thus, in this example, each of the tip dust holes 738 are defined through the pressure sidewall 218 from the top cavity wall 736 to the tip cap 730.

The inlet 740 is substantially circular, and is at least partially surrounded by the respective flow scoop 322 as discussed. The outlet 744 is defined through the tip cap 730, and is in fluid communication with a fluid between the tip extensions 732, 734 of the airfoil 706. Thus, each of the inlets 740 are in fluid communication with the tip flow passage 728 and each of the outlets 744 are in fluid communication with a fluid surrounding the tip 722 of the airfoil 706 to direct fine sand and dust particles in the cooling fluid F out of the airfoil 706. In one example, the flow passage 742 of each of the tip dust holes 738 is curved between the inlet 740 and the outlet 744 such that the inlet 740 and the outlet 744 do not lie in the same plane. Stated another way, the inlet 740 of each of the tip dust holes 738 is offset from the outlet 744 of the respective tip dust hole 738 such that each of the tip dust holes 738 extends along an arc from the top cavity wall 736 to the tip cap 730. In this example, each of the inlet 740 and the outlet 744 are substantially circular and include a respective center point 740c, 744c. In this example, a distance $D_7$ between the center point 740c of the inlet 740 and the center point 744c of the outlet 744 is greater than zero, and in one example, is between about 1 and about 5 times a hydraulic diameter of the inlet 740. In one example, for each tip dust hole 738, the inlet 740 has a diameter $D_8$ and the outlet 744 has a diameter $D_9$. In this example, the diameter $D_8$ is greater than the diameter $D_9$, such that the tip dust hole 738 tapers from the inlet 740 to the outlet 744. By tapering from the inlet 740 to the outlet 744, each of the tip dust holes 738 enhance the momentum of the cooling fluid F exiting the respective tip dust hole 738, which enhances blade tip clearance sensitivity. The fine sand and dust particles and a portion of the cooling fluid F exit the outlet 744 into the fluid surrounding the turbine blade 700. The remainder of the cooling fluid F exits the tip flow passage 728 at the slot (not shown).

Figure 18A:
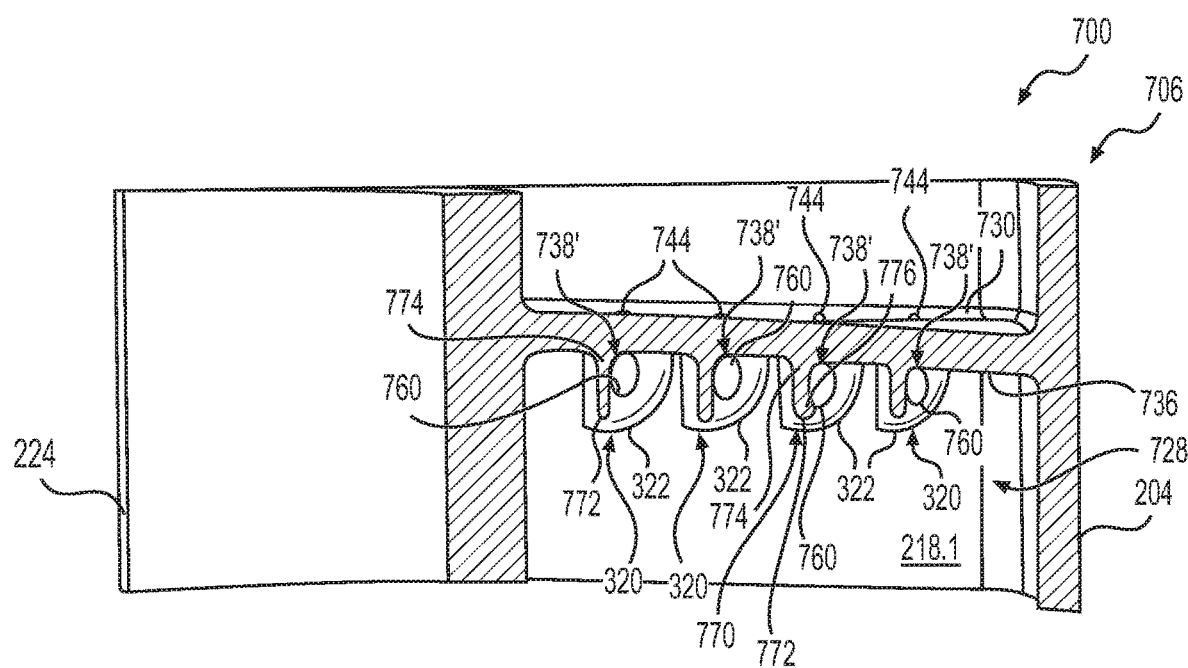
FIG. 18A is a cross-sectional view of another exemplary turbine blade, taken along the perspective of line 8-8 of FIG. 2C, which illustrates a dust tolerant cooling system having a tip dust hole with an elliptical inlet and an outlet at a tip cap of the turbine blade.

It should be noted that in certain embodiments, with reference to FIG. 18A, the tip dust holes 738 may be configured somewhat differently to direct the fluid with the entrained particles out of the turbine blade 700. In the example of FIG. 18A, the airfoil 706 includes a plurality of tip dust holes 738'. In this example, the respective flow scoop 322 surrounds at least a downstream perimeter 760a of an inlet 760 to direct the cooling fluid F, including the entrained particles, into the associated tip dust hole 738'. Each of the tip dust holes 738' defines the flow passage 742 that extends from the inlet 760 to the outlet 744. The inlet 760 is defined through the top cavity wall 736 and a portion of the inner surface 218.1 of the pressure sidewall 218. The inlet 760 is substantially elliptical, and is at least partially surrounded by the respective flow scoop 322 as discussed. Each of the inlets 760 are in fluid communication with the tip flow passage 728 and each of the outlets 744 are in fluid communication with a fluid surrounding the tip 722 of the airfoil 706 to direct fine sand and dust particles in the cooling fluid F out of the airfoil 706. The elliptical shape of the inlets 760 enables a larger volume of the cooling fluid F and entrained particles to flow into the respective tip dust hole 738'. Generally, the area of the ellipse that defines the inlets 760 is greater than an area of the outlets 744. Further, it should be noted that the area of the ellipse that defines each of the inlets 760 may vary along the airfoil 706 such that an area of the inlets 760 of one or more of the tip dust holes 738' may be adjusted as desired.

Figure 18B:
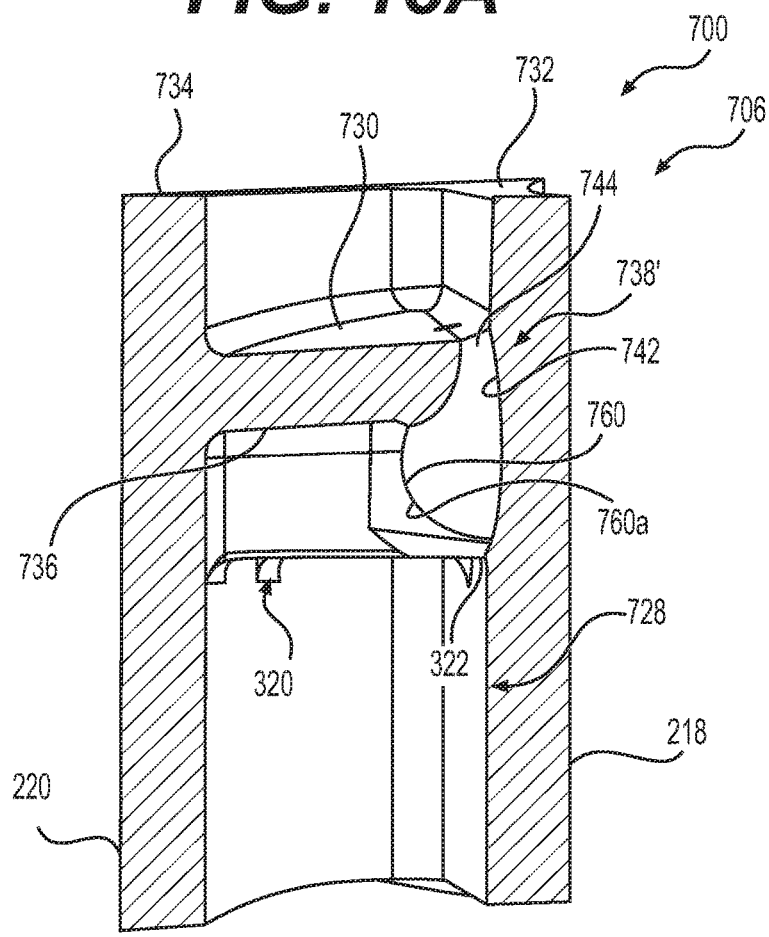
FIG. 18B is another cross-sectional view of the turbine blade of FIG. 18A, taken along the perspective of line 2B-2B of FIG. 2A, which illustrates the dust tolerant cooling system having a flow directing rib that cooperates with the inlet of the tip dust hole.

Further, it should be noted that in certain embodiments, with reference to FIG. 18B, the tip dust holes 738 and the flow directing ribs 320 may be configured somewhat differently to direct the fluid with the entrained particles out of the turbine blade 700. In the example of FIG. 18B, the airfoil 706 includes the plurality of flow directing ribs 320, at least one flow directing rib 770 (FIG. 18A) and a plurality of tip dust holes 738'. The flow directing ribs 320, 770 cooperate with the flow scoops 322 to direct air, including entrained fine sand and dust particles, into the tip dust holes 738', and thus, out of the airfoil 706. In this example, the flow directing rib 770 protrudes from the top cavity wall 736 so as to extend into the tip flow passage 728. The flow directing rib 770 has a first end and an opposite second end (not shown), and a first side 772 opposite a second side 774. The first end is defined on the top cavity wall 736 at or proximate to the inner surface 220.1 of the suction sidewall 220. The second end is defined at or proximate the inner surface 218.1 of the pressure sidewall 218 within the respective flow scoop 322. The first side 772 extends into the tip flow passage 728, while the second side 774 is coupled to the top cavity wall 736. In this example, the flow directing rib 770 has a lip 776 defined along the second side 774. The lip 776 is curved to correspond with a curvature of the inlet 760 to assist in guiding the fluid F into the tip dust hole 738'. The lip 776 may be defined along the first end 772 to extend from the first end to the second end of the flow directing rib 770, or may be defined on the first side 772 proximate the second end or proximate the inlet 760. The flow directing rib 770 may also extend from the first end to the second end at the angle β (FIG. 2G).

As the turbine blade 700 may be manufactured and assembled into a turbine rotor for use in a gas turbine engine in the same manner as the turbine blade 200, the manufacture and assembly of the turbine blade 700 will not be discussed in detail herein.

Figure 19A:
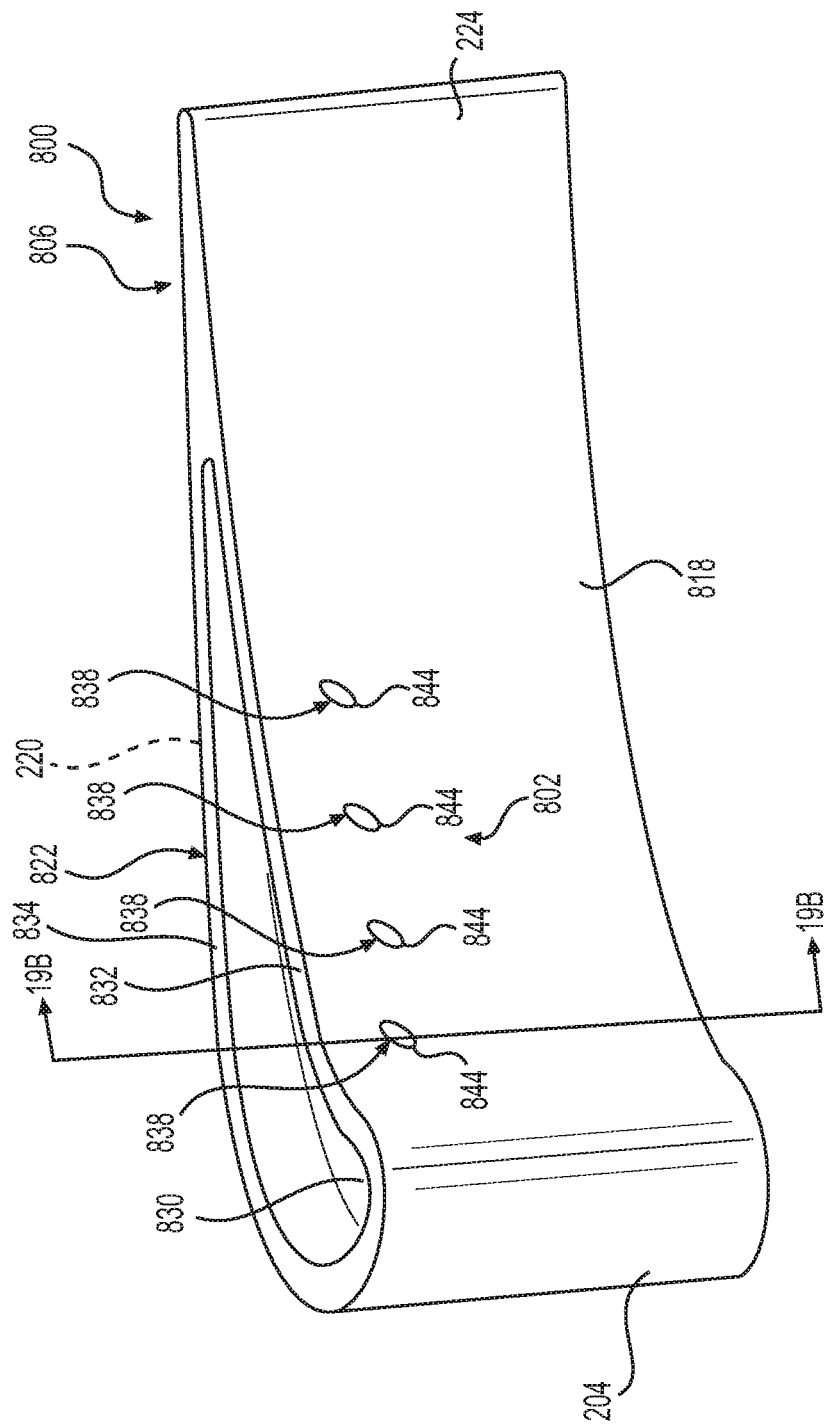
FIG. 19A is a perspective view of another exemplary airfoil for use with the turbine blade of FIG. 2, which illustrates a dust tolerant cooling system having a tip dust hole with an outlet at a pressure sidewall of the airfoil.

It will be understood that the turbine blade 200 described with regard to FIGS. 1-11 may be configured differently to provide dust tolerant cooling to a leading edge flow passage. In one example, with reference to FIG. 19A, an airfoil 806 of a turbine blade 800 is shown. As the turbine blade 800 includes components that are substantially similar to or the same as the turbine blade 200 discussed with regard to FIGS. 1-11 and the turbine blade 700 discussed with regard to FIG. 17, the same reference numerals will be used to denote the same or similar features. The airfoil 806 has a pressure sidewall 818 and the suction sidewall 220. The pressure and suction sidewalls 818, 220 interconnect the leading edge 204 and the trailing edge 224 of the airfoil 806. In one example, as will be discussed in further detail below, a dust tolerant cooling system 802 is defined between the pressure and suction sidewalls 818, 220 along the leading edge of the airfoil 806, and extends along a tip 822 of the airfoil 806. In this example, the dust tolerant cooling system 802 includes the first conduit 240 and the second, trailing edge conduit or second conduit 242 (not shown). The first conduit 240 includes the first platform flow passage 244 (not shown), the leading edge cooling circuit or leading edge flow passage 246 (not shown) and a tip region 826 that includes a tip flag channel or tip flow passage 828.

The tip region 826 including the tip flow passage 828 is in communication with the leading edge flow passage 246 to receive the cooling fluid F (not shown). The tip region 826 including the tip flow passage 828 extends from the leading edge 204 to the trailing edge 224 along the tip 822 of the airfoil 806. In this example, the tip region 826 of the airfoil 806 includes a tip cap (or tip wall) 830 and squealer tip extensions (or parapet walls) 832, 834. The tip cap 830 extends between the squealer tip extensions 832, 834 from the leading edge 204 to the trailing edge 224 of the airfoil 806. Generally, the tip cap 830 is recessed relative to the squealer tip extensions 832, 834, such that the squealer tip extensions 832, 834 extend for a distance above the tip cap 830. In this example, the squealer tip extensions 832, 834 are defined by portions of the pressure sidewall 818 and the suction sidewall 220 that extend radially beyond the tip cap 830.

Figure 19B:
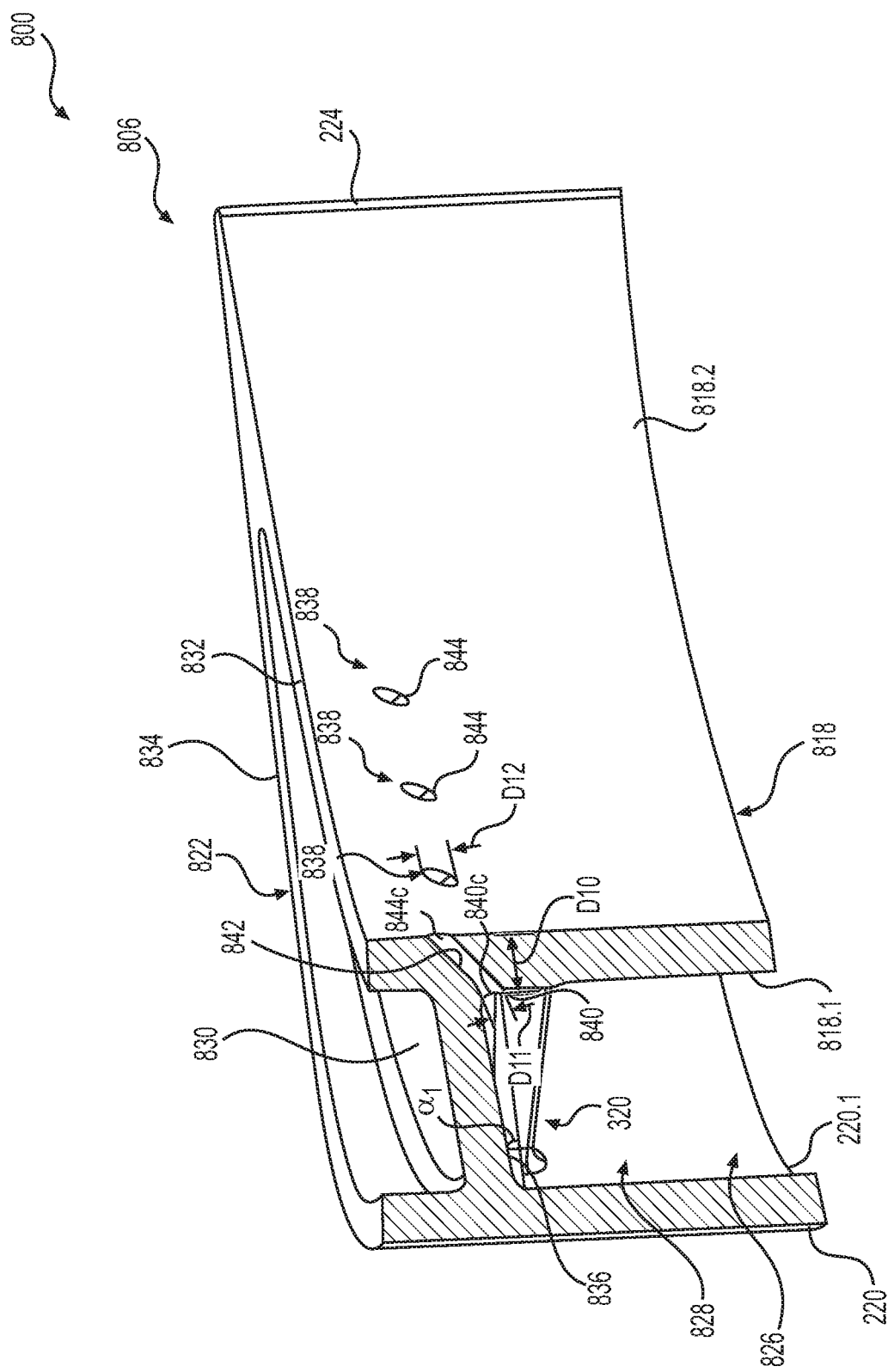
FIG. 19B is a perspective view of another exemplary airfoil for use with the turbine blade of FIG. 2, which illustrates a dust tolerant cooling system having a tip dust hole with the outlet at the pressure sidewall of the airfoil.

In one example, with reference to FIG. 19B, a portion of the tip flow passage 828 is defined by a top cavity wall 836, an inner surface 818.1 of the pressure sidewall 818, the inner surface 220.1 of the suction sidewall 220 and a bottom cavity wall (not shown). The top cavity wall 836 extends from the leading edge 204 to the trailing edge 224, and is opposite the tip cap 830 of the airfoil 806. The top cavity wall 836 bounds the tip flow passage 828, and extends from the pressure sidewall 818 to the suction sidewall 220 at the angle $\alpha_1$, which assists in guiding the cooling fluid F into one of a plurality of tip dust holes 738. The angle $\alpha_1$ is defined between the top cavity wall 836 and a line extending from the inner surface 220.1 of the suction sidewall 220 to the inner surface 818.1 of the pressure sidewall 818. The inner surface 818.1 of the pressure sidewall 818 and the inner surface 220.1 of the suction sidewall 220 interconnect the top cavity wall 836 and the bottom cavity wall.

In this example, the tip flow passage 828 includes the plurality of flow directing ribs 320, a plurality of flow scoops 322 and a plurality of tip dust holes 838. In this example, the tip dust holes 838 are defined through the top cavity wall 836 and the tip cap 830. The flow directing ribs 320 cooperate with the flow scoops 322 to direct air, including entrained fine sand and dust particles, into the tip dust holes 838, and thus, out of the airfoil 806. In one example, for each tip dust hole 838, there is a respective flow directing rib 320 and flow scoop 322 associated with the particular tip dust hole 838. Depending upon the size of the airfoil 806, the airfoil 806 may include about 3 to about 10 flow directing ribs 320, flow scoops 322 and tip dust holes 838 that are spaced apart along the pressure sidewall 818 from the leading edge 204 to the trailing edge 224. Other embodiments may include fewer than 3 or more than 10 flow directing ribs 320, flow scoops 322 and tip dust holes 838. By providing the flow directing ribs 320 and the flow scoops 322, fine sand and dust particles entrained in the cooling fluid F are directed out of the airfoil 806 through the tip dust holes 838, thereby reducing an accumulation of fine sand and dust particles within the airfoil 806. This increases a longevity of the airfoil 806, while ensuring proper cooling fluid F flow through the airfoil 806. A remainder of the cooling fluid F exits the tip flow passage 828 through a slot defined at the trailing edge (not shown).

The respective flow directing rib 320 and the respective flow scoop 322 guide the cooling fluid F with the entrained particles into an inlet 840 of respective tip dust hole 838. The respective flow scoop 322 surrounds a portion of a perimeter or circumference of the inlet 840. Generally, the respective flow scoop 322 surrounds at least a downstream perimeter of the inlet 840 to direct the cooling fluid F, including the entrained particles, into the associated tip dust hole 838. Each of the tip dust holes 838 defines a flow passage 842 that extends from the inlet 840 to an outlet 844. Each of the tip dust holes 838 is defined through the pressure sidewall 818 such that the flow passage 842 is defined between the inner surface 818.1 and an exterior surface 818.2 of the pressure sidewall 818. The inlet 840 is defined through the top cavity wall 836 and a portion of the inner surface 818.1 of the pressure sidewall 818. Thus, in this example, each of the tip dust holes 838 are defined through the pressure sidewall 818 from the top cavity wall 836 to the tip cap 830.

The inlet 840 is substantially circular, and is at least partially surrounded by the respective flow scoop 322 as discussed. The outlet 844 is defined through the pressure sidewall 818, and is in fluid communication with a fluid surrounding tip 822 of the airfoil 806. Thus, each of the inlets 840 are in fluid communication with the tip flow passage 828 and each of the outlets 844 are in fluid communication with a fluid surrounding the pressure sidewall 818 of the airfoil 806 at the tip 822 of the airfoil 806 to direct fine sand and dust particles in the cooling fluid F out of the airfoil 806. In one example, the flow passage 842 of each of the tip dust holes 838 is curved between the inlet 840 and the outlet 844 such that the inlet 840 and the outlet 844 do not lie in the same plane. Stated another way, the inlet 840 of each of the tip dust holes 838 is offset from the outlet 844 of the respective tip dust hole 838 such that each of the tip dust holes 838 extends along an arc from the inner surface 818.1 to the outer surface 818.2. In this example, each of the inlet 840 and the outlet 844 are substantially elliptical and include a respective center point 840c, 844c. It should be noted, however, that the inlet 840 and/or the outlet 844 may be circular or another polygonal shape, if desired. In this example, a distance D10 between the center point 840c of the inlet 840 and the center point 844c of the outlet 844 is greater than zero, and in one example, is between about 1 and about 5 times a hydraulic diameter of the inlet 840. In one example, for each tip dust hole 838, the inlet 840 has a diameter D11 and the outlet 844 has a diameter D12. In this example, the diameter D11 is greater than the diameter D12, such that the tip dust hole 838 tapers from the inlet 840 to the outlet 844. By tapering from the inlet 840 to the outlet 844, each of the tip dust holes 838 enhance the momentum of the cooling fluid F exiting the respective tip dust hole 838, which enhances blade tip clearance sensitivity. The fine sand and dust particles and a portion of the cooling fluid F exit the outlet 844 into the fluid surrounding the turbine blade 800. The remainder of the cooling fluid F exits the tip flow passage 828 at the slot (not shown).

As the turbine blade 800 may be manufactured and assembled into a turbine rotor for use in a gas turbine engine in the same manner as the turbine blade 200, the manufacture and assembly of the turbine blade 800 will not be discussed in detail herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A turbine blade, comprising:
    an airfoil that extends from a platform to a tip, and from a leading edge to a trailing edge, the airfoil having a pressure side and an opposite suction side, the tip having a tip region that extends from the leading edge toward the trailing edge, the tip region bounded by a wall that extends from the suction side to the pressure side at an angle defined between the wall and a horizontal reference line extending from an inner surface of the suction side to an inner surface of the pressure side, with a tip flag channel defined by at least the pressure side, the suction side and the wall, the leading edge having a leading edge cooling circuit that is defined from the platform to the tip flag channel, the leading edge cooling circuit in fluid communication with the tip flag channel to direct cooling fluid received from the platform radially into the tip flag channel, and the pressure side includes at least one tip dust hole defined through the wall proximate the pressure side, the at least one tip dust hole having an inlet in fluid communication with the tip flag channel and an outlet in fluid communication with a fluid surrounding the tip of the airfoil to direct particles in the cooling fluid out of the airfoil, and the at least one tip dust hole is defined proximate the pressure side; and
    at least one rib defined on the wall that extends from the suction side to the pressure side at a second angle to direct the particles and a portion of the cooling fluid into the inlet of each of the at least one tip dust hole, the second angle is different and greater than the angle, and the second angle is less than 90 degrees.

2. The turbine blade of claim 1, wherein the at least one rib is defined on the wall to extend into the tip flag channel at a third angle and the third angle is less than 90 degrees.

3. The turbine blade of claim 1, wherein the at least one rib has a first side opposite a second side, and the first side of the at least one rib is curved relative to the second side such that the at least one rib extends along an arc of an ellipse that has a center above the wall.

4. The turbine blade of claim 1, wherein the at least one rib includes a plurality of ribs, with at least one first rib of the plurality of ribs extending substantially perpendicular to the wall, at least one second rib of the plurality of ribs extending at a third angle relative to the wall, and the third angle is less than 90 degrees.

5. The turbine blade of claim 4, wherein a length of the plurality of ribs increases from the leading edge to the trailing edge.

6. The turbine blade of claim 1, further comprising at least one flow scoop defined on the pressure side about a portion of a perimeter of the inlet of the at least one tip dust hole.

7. The turbine blade of claim 1, wherein the pressure side of the airfoil includes a squealer tip extension, and the at least one tip dust hole is defined through the squealer tip extension.

8. The turbine blade of claim 1, wherein the at least one tip dust hole is defined within the pressure sidewall such that the outlet of the at least one tip dust hole is defined through the wall.

9. The turbine blade of claim 1, wherein the at least one tip dust hole is defined within the pressure sidewall such that the outlet of the at least one tip dust hole is defined through the pressure sidewall.

10. The turbine blade of claim 1, wherein a diameter of the inlet of the at least one tip dust hole is greater than a diameter of the outlet of the at least one tip dust hole.

11. The turbine blade of claim 1, wherein the leading edge cooling circuit includes a plurality of cooling features that are spaced apart radially within the leading edge cooling circuit.

12. The turbine blade of claim 11, wherein the plurality of cooling features comprise a plurality of pins arranged in a plurality of rows, with each pin of the plurality of pins having a first pin end coupled to a first wall opposite the leading edge and a second pin end coupled to a second wall opposite the first wall such that each pin of the plurality of pins spans the leading edge cooling circuit.

13. A turbine blade, comprising:
    an airfoil that extends from a platform to a tip, and from a leading edge to a trailing edge, the airfoil having a pressure side and an opposite suction side, the tip having a tip region that extends from the leading edge toward the trailing edge, the tip region bounded by a wall that extends from the suction side to the pressure side at an angle defined between the wall and a horizontal reference line extending from an inner surface of the suction side to an inner surface of the pressure side, with a tip flag channel defined by at least the pressure side, the suction side and the wall, the leading edge having a leading edge cooling circuit that is defined from the platform to the tip flag channel, the leading edge cooling circuit in fluid communication with the tip flag channel to direct cooling fluid received from the platform radially into the tip flag channel, the leading edge cooling circuit including a plurality of cooling features that are spaced apart radially within the leading edge cooling circuit and the pressure side includes at least one tip dust hole defined through the wall proximate the pressure side, the at least one tip dust hole having an inlet in fluid communication with the tip flag channel and an outlet in fluid communication with a fluid surrounding the tip of the airfoil to direct particles in the cooling fluid out of the airfoil, and the at least one tip dust hole is defined proximate the pressure side; and at least one rib defined on the wall that extends from the suction side to the pressure side at a second angle to direct the particles and a portion of the cooling fluid into the inlet of the at least one tip dust hole, the second angle is different and greater than the angle, and the second angle is less than 90 degrees.

14. The turbine blade of claim 13, wherein the at least one rib is defined on the wall to extend into the tip flag channel at a third angle, and the third angle is less than 90 degrees.

15. The turbine blade of claim 13, wherein the at least one rib has a first side opposite a second side, and the first side of the at least one rib is curved relative to the second side such that the at least one rib extends along an arc of an ellipse that has a center above the wall.

16. The turbine blade of claim 13, wherein the at least one rib includes a plurality of ribs, with at least one first rib of the plurality of ribs extending substantially perpendicular to the wall, at least one second rib of the plurality of ribs extending at a third angle relative to the wall, the third angle less than 90 degrees, and a length of the plurality of ribs increases from the leading edge to the trailing edge.

17. The turbine blade of claim 13, further comprising at least one flow scoop defined on the pressure side about a portion of a perimeter of the inlet of the at least one tip dust hole.

18. The turbine blade of claim 13, wherein the pressure side of the airfoil includes a squealer tip extension, and the at least one tip dust hole is defined through the squealer tip extension.

19. The turbine blade of claim 13, wherein the at least one tip dust hole is defined within the pressure sidewall such that the outlet of the at least one tip dust hole is defined through the wall.

20. The turbine blade of claim 13, wherein the at least one tip dust hole is defined within the pressure sidewall such that the outlet of the at least one tip dust hole is defined through the pressure sidewall.

\* \* \* \* \*